United States Patent [19]

Khokhar et al.

[11] Patent Number: 6,076,234
[45] Date of Patent: Jun. 20, 2000

[54] IN-LINE CABLE TIE

[75] Inventors: Wasim Khokhar, Cordova, Tenn.;
Mark A. Bailey, Senatobia, Miss.;
Peter M. Wells, Jr., Germantown, Tenn.

[73] Assignee: Thomas & Betts Corporation, Memphis, Tenn.

[21] Appl. No.: 09/048,805

[22] Filed: Mar. 26, 1998

Related U.S. Application Data

[63] Continuation-in-part of application No. 08/824,428, Mar. 26, 1997, Pat. No. 5,745,957.

[51] Int. Cl.⁷ .............................. B65D 63/00; F16L 33/00
[52] U.S. Cl. .................. 24/16 PB; 24/17 AP; 24/30.5 P
[58] Field of Search ............................ 24/16 PB, 17 AP, 24/30.5 P

[56] References Cited

U.S. PATENT DOCUMENTS

| | | |
|---|---|---|
| 3,197,829 | 8/1965 | Caveney et al. . |
| 3,488,813 | 1/1970 | Kohke ................................... 24/16 PB |
| 3,735,448 | 5/1973 | Waddington . |
| 3,886,630 | 6/1975 | Emery . |

(List continued on next page.)

FOREIGN PATENT DOCUMENTS

| | | |
|---|---|---|
| 0 001 974 | 5/1979 | European Pat. Off. . |
| 0 035 368 | 9/1981 | European Pat. Off. . |
| 0 090 726 | 10/1983 | European Pat. Off. . |
| 0 235 997 A1 | 9/1987 | European Pat. Off. . |
| 1123839 | 9/1956 | France ................................. 24/16 PB |
| 1573303 | 7/1969 | France ................................. 24/16 PB |
| 2 502 265 | 9/1982 | France . |
| 29 46 258 | 6/1980 | Germany . |
| 29 42 393 | 1/1986 | Germany . |
| 1 291 172 | 10/1972 | United Kingdom . |
| 1 323 198 | 7/1973 | United Kingdom . |
| 1 418 900 | 12/1975 | United Kingdom . |
| 1 504 147 | 3/1978 | United Kingdom . |
| 1 519 233 | 7/1978 | United Kingdom . |
| 1 524 577 | 9/1978 | United Kingdom . |
| 2 024 918 | 1/1980 | United Kingdom . |
| 2 040 352 | 8/1980 | United Kingdom . |
| 2 037 869 | 10/1982 | United Kingdom . |
| 2 163 707 | 8/1988 | United Kingdom . |
| 2 210 097 | 1/1992 | United Kingdom . |
| 2308 153 | 6/1997 | United Kingdom . |
| 86 07333 | 12/1986 | WIPO . |

OTHER PUBLICATIONS

Panduit Electrical Group Catalog, Section A, p. 8, Nov. 5, 1993.

*Primary Examiner*—Victor N. Sakran
*Attorney, Agent, or Firm*—Hoffmann & Baron, LLP

[57] ABSTRACT

A cable tie includes an elongate generally planar strap and a head. The head includes a tapering entrance into a passageway therethrough for inserting the strap and a flexibly hinged locking pawl adjacent the passageway. The head also includes a fixed locking tooth adjacent the entry end of the passageway for engaging the strap after full securing an article or articles to be bundled. The fixed locking tooth of the present invention is desirably positioned to allow unobstructed insertion of the tail through the head. The present invention is able to minimize the stretching of the strap body when adjacent to the locking pawl by providing an edge which frictionally engages the strap body as the strap body egresses from the passageway of the head. Furthermore, the present invention may include a pair of counter-rotatable locking elements positioned to one side of the passageway through the head. One of the counter-rotatable locking elements may deflect into engagement with a surface of an article being bundled so as to provide greater slip resistance of the cable tie with respect to the article and to further allow an even smaller bundling radius for the cable tie. Additionally, the present invention provides a cable tie having a tamper-resistant locking pawl. Furthermore, the cable tie of the present invention may include a deflectable locking element which may be integrally formed with the head or separately provided within the head.

19 Claims, 18 Drawing Sheets

U.S. PATENT DOCUMENTS

| | | |
|---|---|---|
| 3,906,593 | 9/1975 | Caveney et al. . |
| 3,949,449 | 4/1976 | Caveney et al. . |
| 3,983,603 | 10/1976 | Joyce ................................. 24/16 PB |
| 4,003,106 | 1/1977 | Schumacher et al. . |
| 4,272,047 | 6/1981 | Botka . |
| 4,287,644 | 9/1981 | Durand . |
| 4,422,217 | 12/1983 | Barrette . |
| 4,447,934 | 5/1984 | Anscher . |
| 4,457,095 | 7/1984 | Stevenson ........................ 24/16 PB |
| 4,458,385 | 7/1984 | Espinoza ........................... 24/16 PB |
| 4,507,828 | 4/1985 | Furutsu ............................. 24/16 PB |
| 4,631,782 | 12/1986 | Gecs . |
| 4,680,834 | 7/1987 | Andre et al. . |
| 4,766,651 | 8/1988 | Kobayashi et al. . |
| 5,224,244 | 7/1993 | Ikeda et al. . |
| 5,414,904 | 5/1995 | Sampson ............................ 24/17 AP |

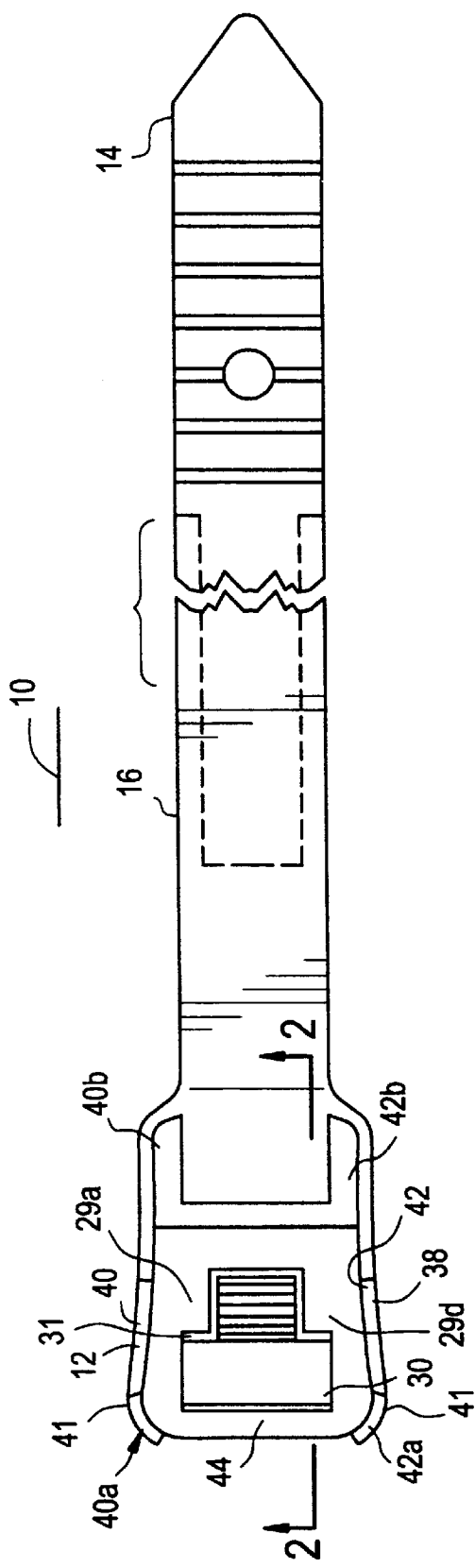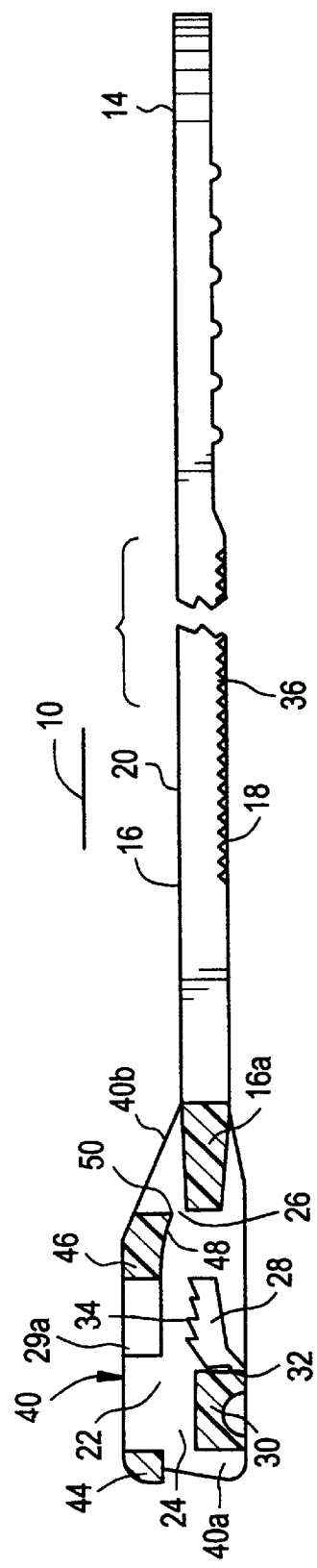

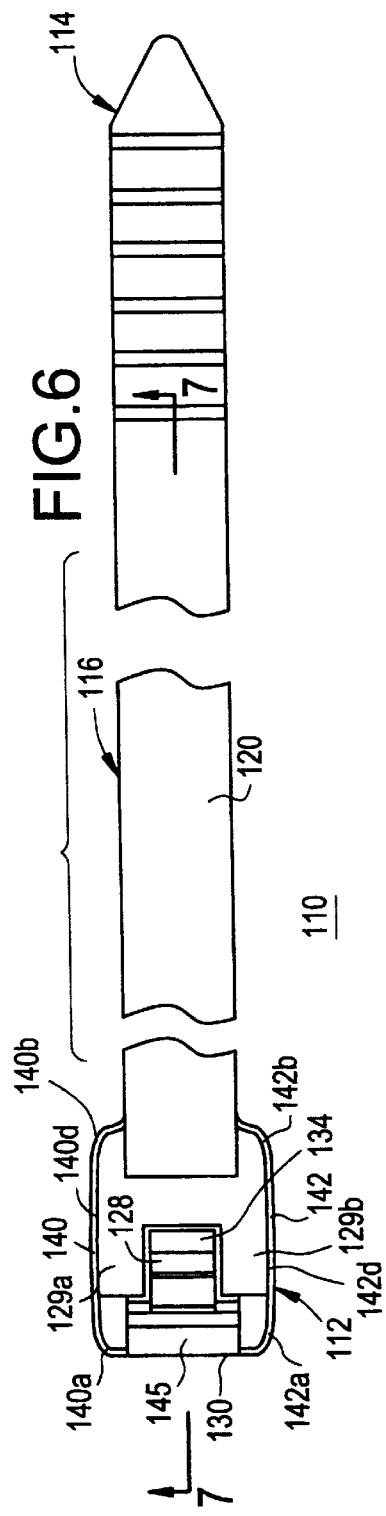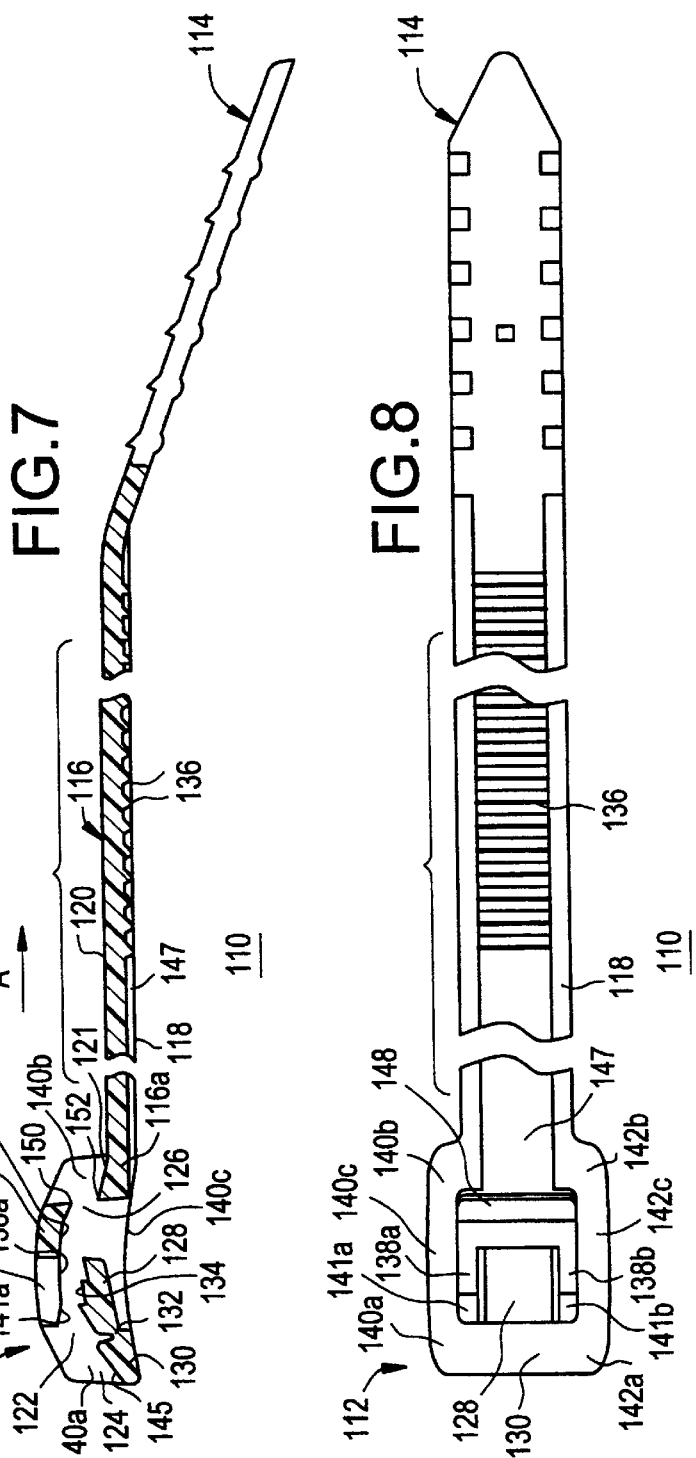

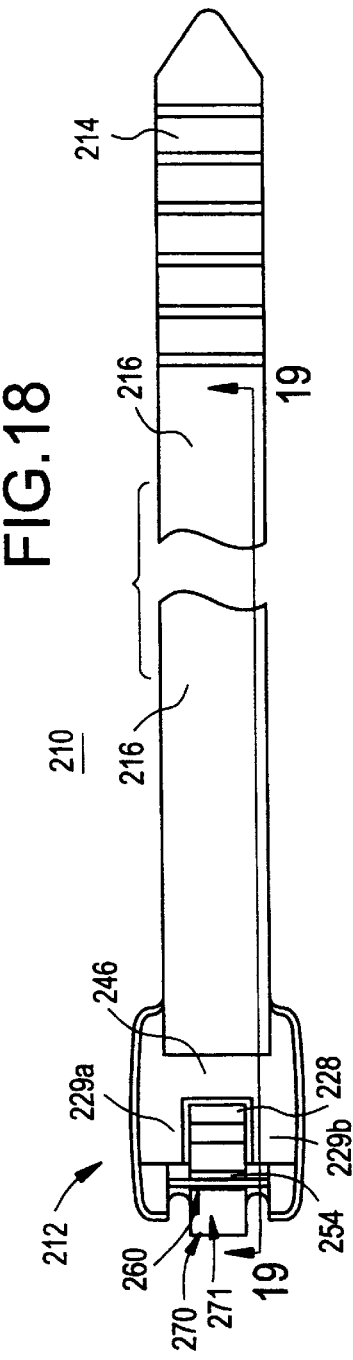
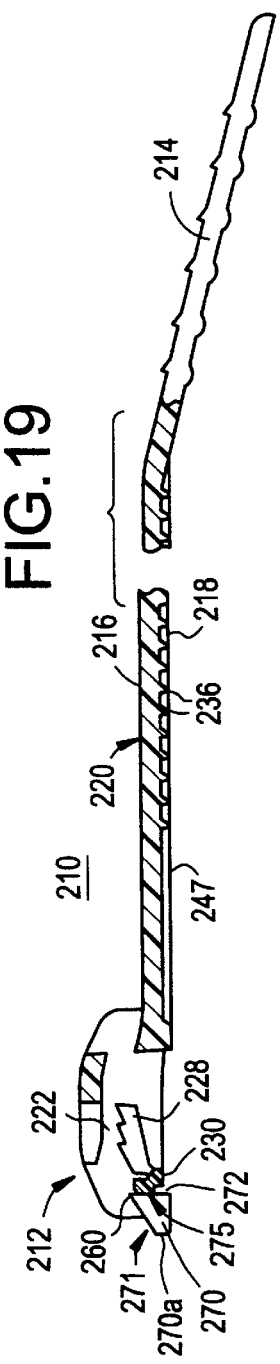
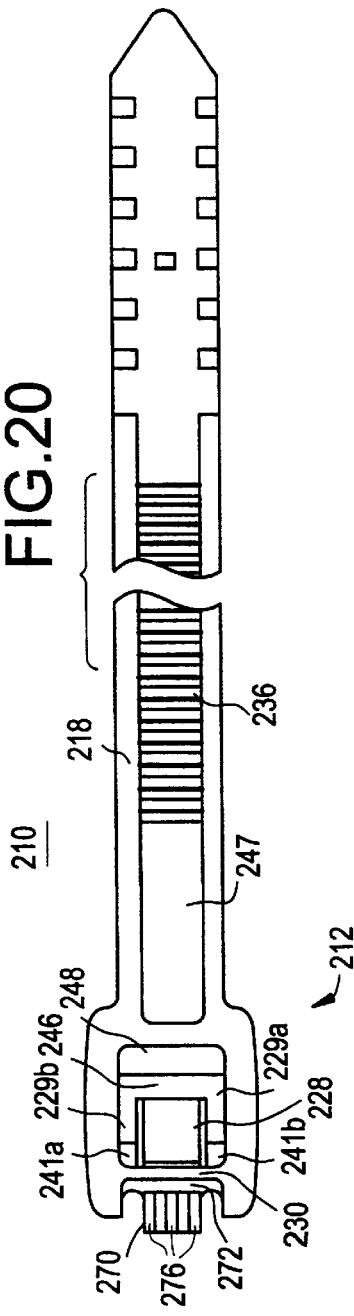

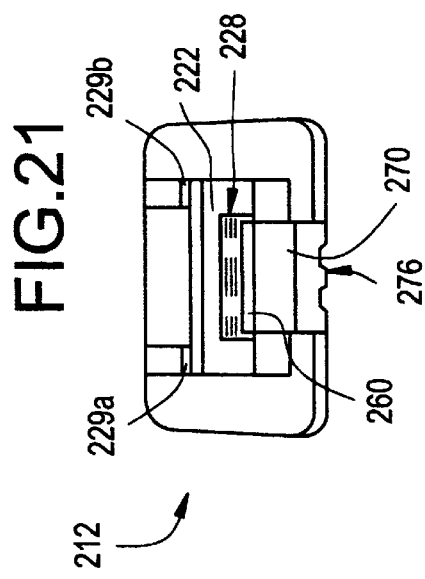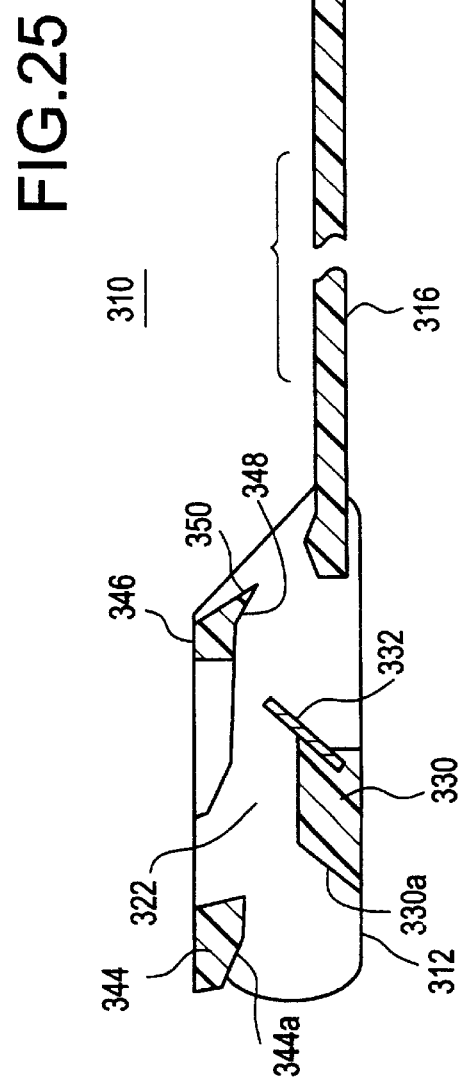

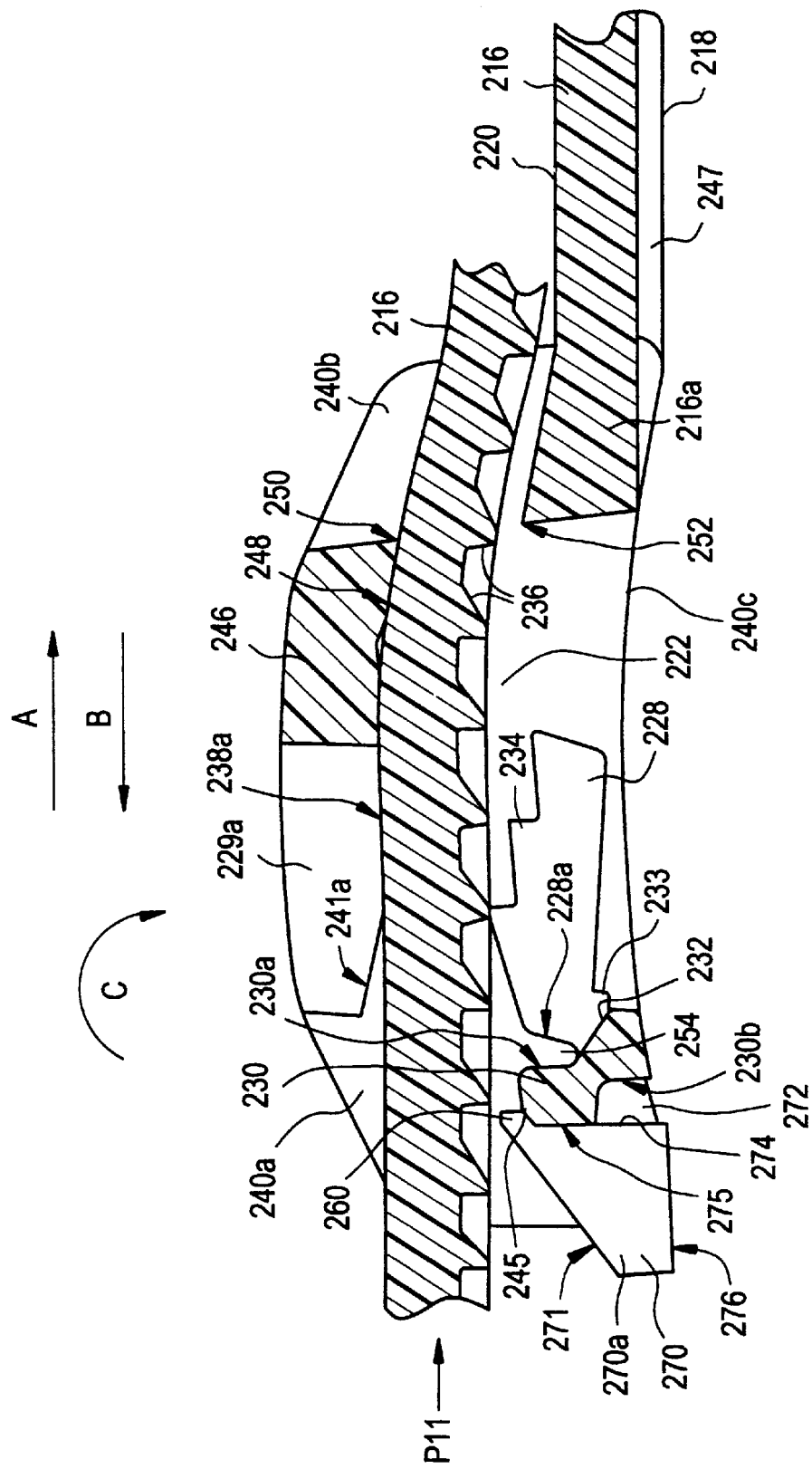

IN-LINE CABLE TIE

This is a continuation in part of Ser. No. 08/824,428, filed Mar. 26, 1997, now U.S. Pat. No. 5,745,957.

FIELD OF THE INVENTION

The present invention relates to cable ties used to bundle an article or a group of articles. More specifically, the present invention relates to parallel-entry cable ties having a passageway through the head of the cable tie in a direction substantially parallel to the plane of the strap of the cable tie.

BACKGROUND OF THE INVENTION

The use of cable ties to bundle or secure a group of articles is well known. Known cable ties of conventional construction are elongate members having a head at one end, a tail at the other end, and a longitudinal strap therebetween. The strap is wrapped around a bundle of articles and the tail is inserted through an aperture or passageway in the head. The head of the cable tie typically includes a locking element which is engagable with the strap so that when the tail is pulled through the passageway in the head, the locking element secures the strap in the head.

The locking element may be formed as a fixed member which interferes with the strap being inserted through the passageway in the head, or may be formed to deflect away from the strap during insertion therepast. Fixed locking elements require relatively high insertion forces in order to insert the strap through the passageway in the head as such locking elements require elastic deformation of one or both of the locking element and strap for strap insertion. U.K. Patent No. 2 163 707 provides an example of a cable tie having a fixed locking element within the passageway of the head which requires mechanical elastic deformation in order for the strap to be inserted past the locking element. U.K. Patent Application No. 2 024 918 provides another example of a cable tie having a number of fixed locking elements within the passageway in the head which interfere with strap insertion and require elastic deformation to allow the strap therepast. From an ergonomic perspective, such cable ties may generally require unacceptably high insertion forces due to the locking element interfering with the insertion of the strap.

Deflectable locking elements, conversely, are well-known in the art for reducing the force required for strap insertion through the passageway. Deflectable locking elements are designed to acquiesce to the strap during strap insertion while being biased into engaging the strap during attempted withdrawal of the strap in a direction opposite to the insertion direction. Cable ties including a deflectable locking element generally take the form of a so-called one-piece cable tie, which include an integrally-formed flexibly mounted pawl, or a two-piece cable tie, which include a metallic locking barb embedded into the cable tie head so as to protrude into the passageway. U.S. Pat. No. 3,965,538 discloses a one-piece cable tie where the locking element is formed integrally within the head of the cable tie. Such cable ties require relatively low insertion forces but provide relatively lower long-term loop tensile strength. U.S. Pat. No. 5,517,727 discloses a two-piece cable tie which employs a metal barb embedded in the head at an acute angle to the inserted tail. The metal barb bites into the strap upon any attempt to withdraw the strap therefrom. Two-piece cable ties generally require a relatively higher insertion force but provide a relatively higher long-term loop tensile strength.

The art has also seen hybrid-type cable ties which include both fixed and deflectable locking members within the head. French Patent Publication No. 2 502 265 discloses a one-piece parallel-entry cable tie having two transverse locking teeth formed within the cable tie head which project into the passageway and engage the mating transverse locking teeth formed on the strap. One of the locking teeth in the head is formed on a deflectable pawl while the other locking tooth is formed thereadjacent on a cross-piece from which the deflectable pawl projects and thereby remains within the passageway throughout strap insertion. European Patent Application No. 0 090 726 discloses a one-piece parallel-entry cable tie which provides a pair of tapering or triangular detents on the sidewalls of the passageway for frictionally engaging the longitudinal edges of the strap. The tapering design of these detents tends to force the strap away from the cross-piece which supports a deflectable pawl while frictionally gripping the longitudinal edges of the strap. Each of these cable tie having a hybrid design therefore provides fixed locking members which project into the passageway and frictionally engage the full length of the strap being inserted therepast, further increasing the insertion force required for strap insertion.

Thus while the hybrid designs of the prior art employ fixed teeth on the cable tie head, these teeth increase the insertion force required throughout strap insertion through the head because, in order to provide any locking capability at all, these fixed teeth must protrude into passageway and frictionally engage, and thereby impede, the entire portion of the strap being inserted therepast.

As noted above, one-piece cable ties provide a flexibly mounted pawl that is deflected by the strap during strap insertion through the passageway in the head. Both the pawl and the surface of the strap which the pawl engages typically include transverse locking teeth which interact when the forces applied to the strap attempt to withdraw the strap back out of the head. Upon application of such withdrawal forces, the transverse locking teeth on the pawl engage the transverse locking teeth on the strap to prevent the strap from being withdrawn from the head in a direction opposite to the insertion direction.

However, when insertion forces are applied to the tail of the cable tie, or to that portion of the strap which has been inserted through the head and now protrudes from the passageway, the strap will stretch to a certain extent. Stretching of the strap thereby causes the transverse locking teeth on the strap to be spaced further apart so that their interaction with the unstretched transverse locking teeth on the pawl may be adversely affected. The withdrawal forces acting on the strap would be transferred to less of the transverse locking teeth on the pawl as the pitch alignment of the teeth on the strap has been disturbed. There is a higher likelihood of the pawl failing to retain the strap or to prevent slippage of strap in the withdrawal direction, thereby resulting in a less secure bundling.

The art has also seen cable ties, such as that disclosed in U.S. Pat. No. 3,886,630, which provide a passageway through the head in a direction substantially parallel to the strap. These so-called parallel-entry cable ties may generally have a lower profile, in that the cable tie head does not protrude as far above the articles being bundled, than the more conventional orthogonal-entry cable ties in which the passageway extends through the head in a direction substantially transverse to the plane of the strap. U.S. Pat. No. 3,965,538 provides an example of a parallel-entry cable tie. A lower profile is especially desirable in instances, such as with long lengths of bundled aircraft cable being pulled through bulkhead openings or across edges or corners in a crawlspace, where the cable tie head could catch on a projection and be pulled relative to the bundled articles.

The ability of a cable to resist being pulled relative to the bundled articles is also related to the strap being able to tightly encircle the bundled articles. The smaller the bundling radius that the strap is able to assume, the smaller the diameter of a bundle that the cable tie may secure. When a cable tie bundles a number of articles presenting a bundle diameter that is greater than the bundling radius of the cable tie, the cable tie will be better able to secure that number of articles and thereby minimize slippage of the cable tie along the length of the bundled articles.

Some parallel-entry cable ties, such those disclosed in U.S. Pat. Nos. 4,272,047 and 4,631,782, position a flexible pawl within the head so that the passageway is between the pawl and the articles to be bundled. When the cable tie is assembled, the pawl is accessible and may be disengaged from the inserted strap. Such cable ties are therefore not tamper-resistant as the pawl will be accessible and the bundle of articles may be released from the cable tie.

It is also known in the art to provide tools which perform the functions of pulling the tail and strap through the head. Some tools also include the capability of cutting-off a portion of the tail and strap which exits out from the passageway in the head. Such tools, however, result in exposed sharp edges at the truncated end of the strap exiting the head. The sharp edges on the truncated end of the strap pose a hazard to those handling the bundled articles.

It is therefore desirable to provide a low profile parallel-entry cable tie providing relatively low insertion forces and which can overcome the above-noted deficiencies in the prior art.

SUMMARY OF THE INVENTION

It is an object of the present invention to provide a cable tie having a low profile.

It is another object of the present invention to provide a cable tie that will minimize the stretching of the strap within the head when the portion of the strap exiting out the head is pulled in an insertion direction for the cable tie.

It is a further object of the present invention to provide a cable tie having a required strap insertion force approximately about that of a one-piece cable tie and a loop tensile strength of above that known for a one-piece cable tie.

It is still a further object of the present invention to provide a cable tie providing easy insertion of the tail of the cable tie into the passageway through the head of the cable tie.

It is even still a further object of the present invention to provide a cable tie able to assume a small bundling diameter.

It is yet still a further object of the present invention to provide a cable tie able to resist slippage along the length of the articles being bundled.

It is still another object of the present invention to provide a cable tie that, once assembled, may have excess strap severed therefrom such that the cut edges of the strap thereby resulting are sheltered by the cable tie.

It is yet another object of the present invention to provide a cable tie having a tamper-resistant locking mechanism.

In the efficient attainment of these and other objects, the present invention provides a bundling tie including an elongate strap body and a ahead having a passageway therethrough for insertably accommodating the strap body. A flexible pawl is located within the head that deflects to allow the strap body to be inserted through the head in an insertion direction and that engages the strap body to prevent the strap from being withdrawn from the head in a direction opposite the insertion direction. The head also includes a surface flaring into the passageway to engage the inserted strap so as to minimize strap stretching in the vicinity of the pawl when a portion of the strap body extending through the head is pulled in the strap insertion direction.

The head of the cable tie of the present invention also provides side walls extending down the length of the strap body adjacent to the head between which the excess strap exiting the head may be severed.

The head of the cable tie of the present invention may also be bowed so as to conform about the articles being bundled so as to further minimize the profile of the cable tie.

The head may further provide a passageway through the head which includes a strap ingress end defined by at least one tapering surface to thereby ease strap insertion into the passageway.

The head may also include a fixed tooth or teeth which engages the strap body upon tightening about a bundle so as to further assist the flexible pawl in preventing the strap from being withdrawn from the head in a direction opposite the insertion direction.

The head may further include a pair of counter-rotatable deflectable locking members to one side of the passageway which are able to deflect under tightening of the strap so as to provide a reduced bundling radius and greater slip resistance of the cable tie relative to the bundle.

BRIEF DESCRIPTION OF THE DRAWINGS

FIG. 1 shows a top plan view of a cable tie of the present invention.

FIG. 2 is a side sectional view of the cable tie of FIG. 1.

FIG. 6 shows a top plan view of a cable tie of the present invention.

FIG. 7 is a side sectional view of the cable tie of FIG. 6.

FIG. 8 shows a bottom plan view of the cable tie of FIG. 6.

FIG. 18 shows a top plan view of a cable tie of the present invention.

FIG. 19 is a side sectional view of the cable tie of FIG. 18 taken through line 19—19.

FIG. 20 is a bottom plan view of the cable tie of FIG. 18.

FIG. 21 is a front plan view of the cable tie of FIG. 18.

FIG. 22 is a side sectional view of the head of the cable tie of FIG. 18 as a strap is inserted therethrough.

FIG. 25 shows a head design for a two-piece cable tie of the present invention.

DETAILED DESCRIPTION OF THE PREFERRED EMBODIMENT

Figure 3:
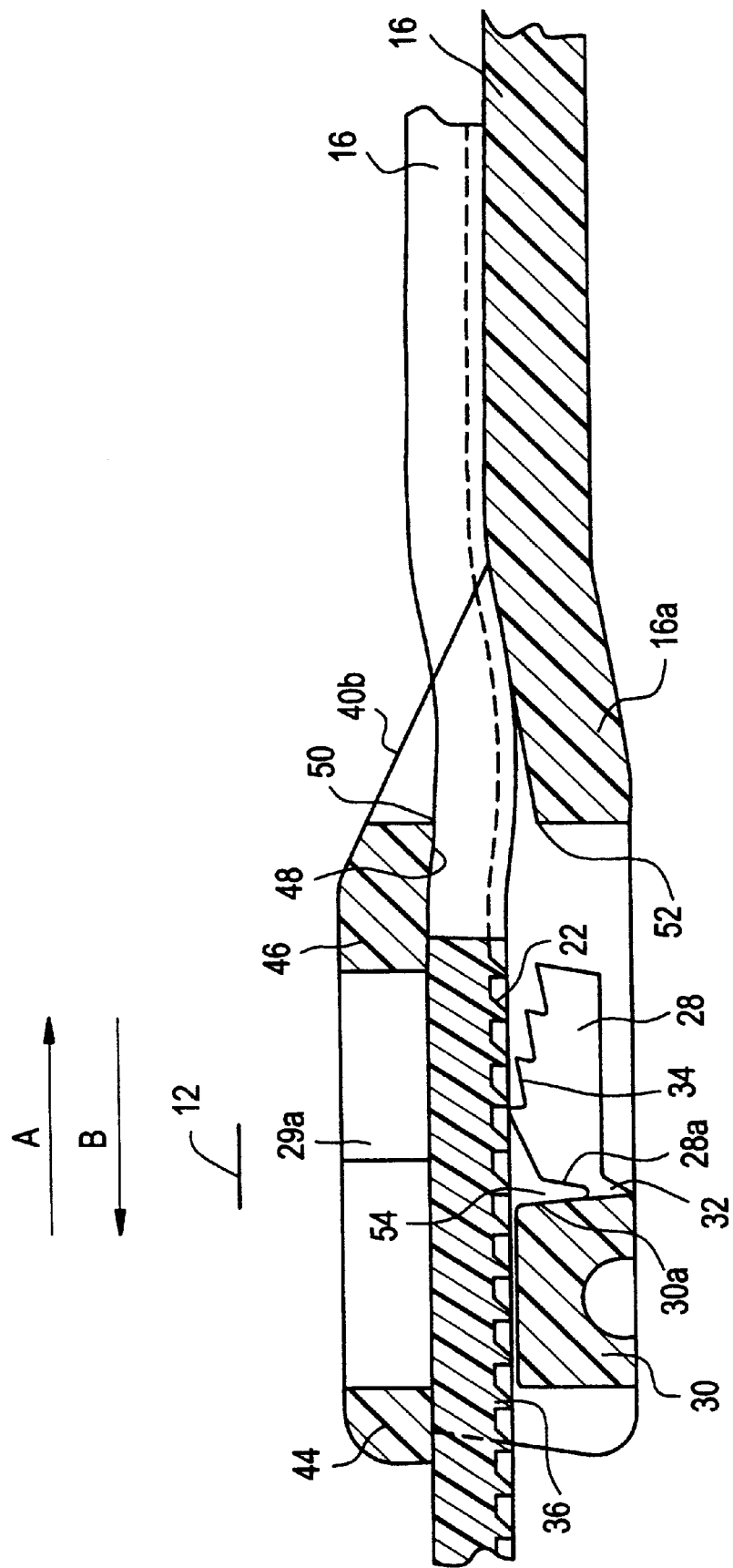
FIG. 3 is a side sectional view of the cable tie of FIG. 1 as the strap body is being inserted through the head.

FIGS. 1–5 show a cable tie 10 of the present invention. With reference to FIGS. 1 and 2, cable tie 10 is an elongate member including a head 12, an opposed tail 14, and an elongate strap body 16 therebetween. Strap body 16 is typically planar shaped having first and second opposed major surface 18 and 20. Head 12 includes passageway 22 therethrough. Passageway 22 includes strap ingress end 24 and strap egress end 26. Head 12 also includes a flexibly mounted rigid locking pawl 28 adjacent passageway 22 and centrally located across from detents 29a and 29b. As seen in FIG. 1, head 12 defines a clearance gap 31 about pawl 28 so as to ensure the manufacturability of cable tie 10 by conventional molding techniques. Gap 31 also defines the transverse extents of a flexible hinge 32 by which locking pawl 28 connects to a transverse shoulder 30. Locking pawl 28 also includes a plurality of transverse locking teeth 34 which engage the transverse locking notches 36 provided on major surface 18 of strap body 16 when inserted through passageway 22 of head 12.

Head 12 may be described as having a boundary wall 38 which includes side walls 40, 42 and rear brace 44. Side walls 40 and 42 include distal ends 40a and 42a respectively, adjacent the strap ingress end 24, and proximal ends 40b and 42b respectively, adjacent strap egress end 26. Strap body end 16a extends between the proximal ends 40b and 42b of side walls 40 and 42. Rear brace 44 spans between proximal ends 40a and 42a in flush edge relationship therewith and defines the upper limit of strap ingress end 24 of passageway 22. Front brace 46 spans between side walls 40 and 42 in flush edge relationship therewith and adjacent proximal ends 40b and 42b. Front brace 46 includes flared surface 48 which terminates in edge 50. Edge 50 defines the upper limit of strap egress end 26 of passageway 22. The top transverse edge 52 of end 16a defines the lower limit of strap egress end 26 of passageway 22.

Shoulder 30 spans between side walls 40 and 42 adjacent distal ends 40a and 42a and defines the lower extent of passageway 22. As seen in FIG. 2, locking pawl 28 is flexibly connected to shoulder 30 by flexible hinge 32. Flexible hinge 32 defines the closed end of a transverse notch 54 between locking pawl 28 and shoulder 30. Transverse notch 54 opens towards passageway 22. In an undetected position, locking pawl 28 protrudes into passageway 22.

Figure 4:
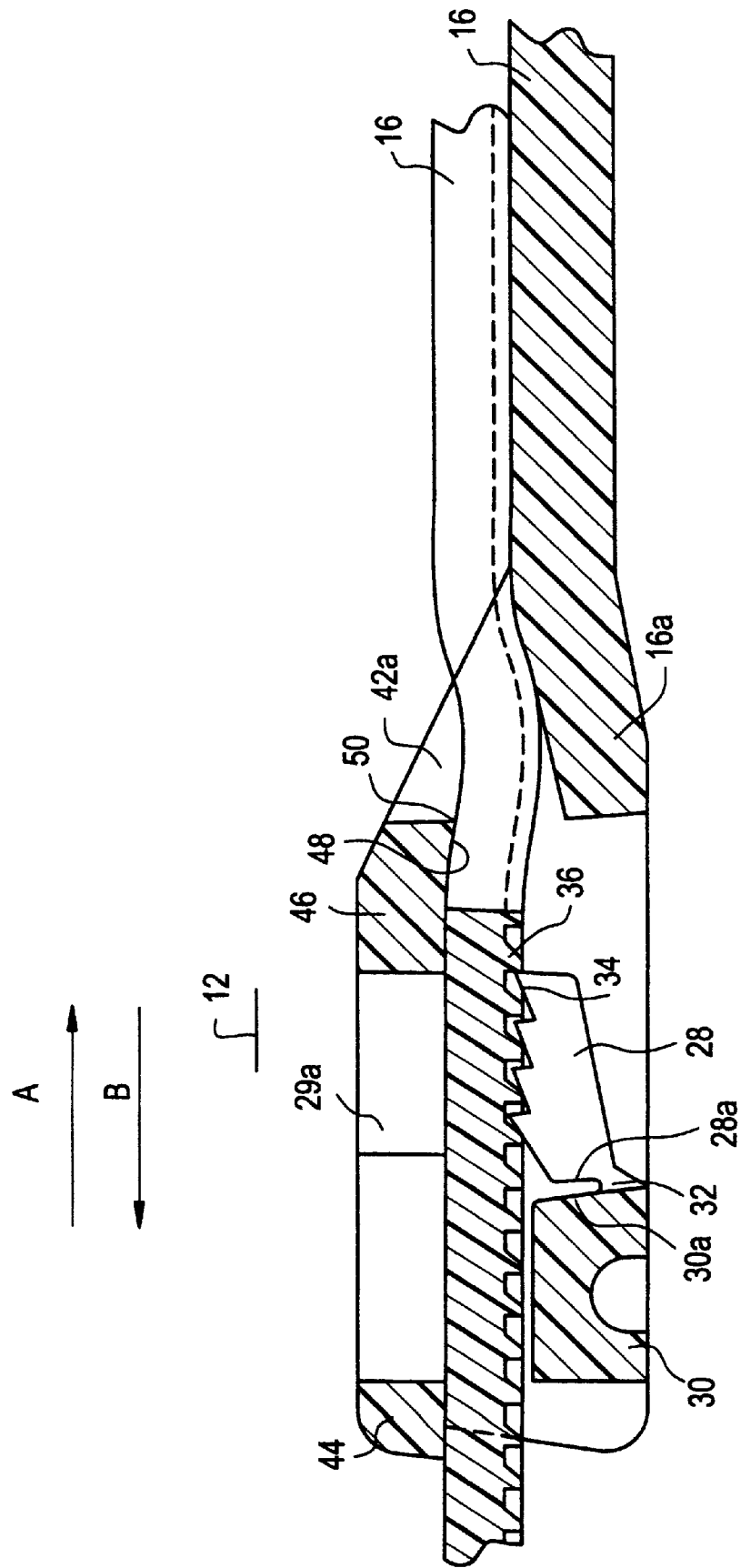
FIG. 4 is a sectional view of the cable tie of FIG. 1 as the insertion force is relaxed.
Figure 5:
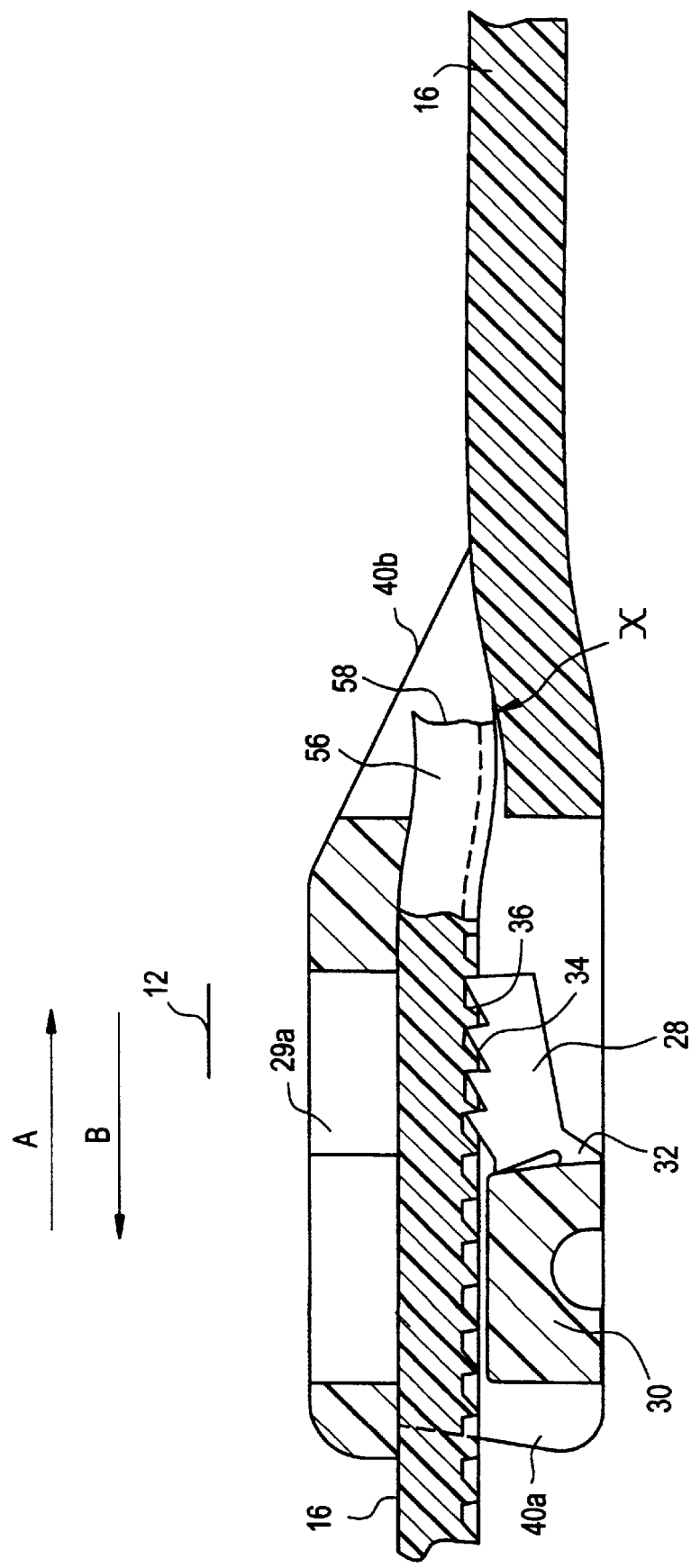
FIG. 5 is a sectional view of the cable tie of FIG. 1 after the excess strap has been severed.

As shown in FIG. 3, the insertion of tail 14 and strap body 16 through passageway 22 in the direction of arrow A causes locking pawl 28 to pivot away from passageway 22 so that tail 14 and strap body 16 may pass through head 12. As is known in the art, the pivoting of locking pawl 28 actually includes a combination of rotation and deflection about hinge 28. With reference to FIG. 4, when withdrawal forces acting in the direction of arrow B are applied to strap body 16, pawl locking teeth 34 engage locking notches 36 on strap body 16. Locking pawl 28 will pivot in a direction opposite to the insertion pivot direction until pawl surface 28a abuts against shoulder surface 30a as shown in FIG. 5. Strap body 16 is forced against detents 29a and 29b by locking pawl 28.

Flared surface 48 and edge 50 extend slightly into passageway 22. After strap body 16 is inserted through passageway 22 past locking pawl 28, flared surface 48 and edge 50 force major surface 20 of strap body 16 against top transverse edge 52 of end 16a. When forces in the direction of arrow A are applied to that portion of the strap body that protrudes from passageway 22, flared surface 48 and edge 50 thereby frictionally grip major surface 20 of strap body 16. By applying this resistance, flared surface 48 minimizes the stretching of strap body 16 within head 12 due to the application of insertion forces in the direction of arrow A. As a result, the longitudinal deflection of locking notches 36 on major surface 20 of strap body 16 is also minimized so that the alignment between locking notches 36 and pawl locking teeth 34 is better maintained.

As is seen in FIG. 1, side walls 40 and 42 preferably include external dimensions that provide a slight taper away from each other at distal ends 40a and 42a so as to form a bulge 41. Bulge 41 provides a cable tie installer with a better grip of head 12 when passing strap body 16 through passageway 22. Bulge 41 also allows the installer to apply a force to head 12 in the direction of arrow B to counter the strap insertion force in the direction of arrow A.

In conventional operation known for cable ties, tail 14 is wrapped around a bundle of articles and inserted in the direction of arrow A into strap ingress end 24 of passageway 22 through head 12. Tail 14 extends through passageway 22, exiting head 12 through strap egress end 26. As the strap is similarly pulled through passageway 22, locking pawl 28 is rotated and deflected about flexible hinge 32 in a direction away from the inserted strap body, as shown in FIG. 3. Tail 14 is pulled through head 12 until the cable tie tightly encircles the bundle of articles. As the encirclement of the bundle of articles grows tighter, continued pulling on tail 14 in the direction of arrow A causes tail 14 and strap body 16 to longitudinally expand in the direction of arrow A. The engagement by flared surface 48 of major surface 18 of strap body 16 provides resistance to the continued pulling on tail 14 and thereby limits the longitudinal expansion of strap body 16 within head 12. While the portion of strap body 16 protruding from head 12 remains subject to the full tensile load of the continued pulling of tail 14, the portion of strap body 16 within head 12 will be subject to a lesser tensile load so that the longitudinal expansion of locking notches 36 about pawl locking teeth 34 will be minimized.

It is contemplated that the portion of tail 14 and strap body 16 protruding from head 12 may be engaged and pulled on by a tool (not shown) used for tightening cable ties as is known in the prior art. The tool, once cable tie 10 is secured about the bundle of articles, can also sever the portion of strap body 16 protruding from head 12 at location X between proximal ends 40b and 42b of side walls 40 and 42 respectively. As shown in FIG. 5, severing of strap body 16 results in severed end 56 having severed perimetrical edge 58. Proximal ends 40b and 42b serve as a pair of strap edge-barriers by extending beyond location X sufficiently to maintain severed perimetrical edge 58 therebetween and to obviate hazards posed by the severed perimetrical edge 58.

The release or severing of strap body 16 results in forces acting in the direction of arrow B to recoil strap body 16 across locking pawl 28 and around the bundle of articles. Such a recoiling force causes pawl locking teeth 34 to engage locking notches 36 on strap body 16 so that locking pawl 28 is caused to counter-rotate and deflect back towards strap body 16. Locking pawl 28 will continue to counter-rotate until pawl surface 28 abuts against shoulder surface 30a. The positioning of locking pawl 28 between the bundle of articles and strap body 16 and side walls 40 and 42 provides a tamper-resistant locking engagement between locking pawl 28 and strap body 16 so that the bundle of articles remains bound by cable tie 10.

FIGS. 6–11 show another cable tie 110 of the present invention. With reference to FIGS. 6–8 and using similar numbering to denote similar components for performing similar functions, cable tie 110 is an elongate member including a head 112, an opposed tail 114, and an elongate strap body 116 therebetween. Strap body 116 is typically planar shaped having first and second opposed major surface 118 and 120. Tail 114 may be bent to a certain degree to assist in the insertion of strap body 116 into head 112. Head 112 includes passageway 122 therethrough. Passageway 122 includes strap ingress end 124 and strap egress end 126. Head 112 also includes a flexibly mounted rigid locking pawl 128 adjacent passageway 122 across from detents 129a and 129b. Locking pawl 128 is connected to shoulder 130 by a flexible hinge 132. Locking pawl 128 also includes a plurality of transverse locking teeth 134 which engage the transverse locking teeth 136 provided on major surface 118 of strap body 116 when inserted through passageway 122 of head 112.

Head 112 includes side walls 140 and 142. Each side wall 140 and 142 includes a distal end 140a and 142a adjacent the strap ingress end 124, respectively, a proximal end 140b and 142b adjacent strap egress end 126, respectively, a bottom surface 140c and 142c, respectively and a centrally-disposed upper surface 140d and 142d, respectively. In order to further decrease the profile of head 112 with respect to the bundled article or articles, distal ends 140a and 142a and proximal ends 140b and 142b may taper from bottom surfaces 140c and 142c towards upper surfaces 140d and 142d. In a preferred embodiment, bottom surfaces 140c and 142c are slightly bowed in an outward direction with respect to an article or group of articles (not shown) being bundled. The generally arcuate bowing of bottom surfaces 140c and 142c allows head 112 to further conform to the circumferential or peripheral shape of the article or articles being bundled, thus decreasing its profile with respect to the article or articles. Furthermore, by bowing the bottom surfaces 140c and 142c, cable tie 110 may suitably encircle and engage an article or articles having a relatively small bundle diameter, for example, approximately 0.125 inches. Similarly, in a preferred embodiment, major surface 118 includes a groove or channel 147 which extends from locking teeth 136 into head 112 between proximal ends 140b and 142b. Channel 147 provides more flexibility of strap body 116 at its interface with head 112 which allows strap body 116 to encircle and engage an article or articles having relatively small bundle diameters.

Strap body end 116a extends between the proximal ends 140b and 142b of side walls 140 and 142 in flush edge relationship with bottom surfaces 140c and 142c and terminates at a transverse edge 152 adjacent egress end 126 of passageway 122. Similarly, it is also contemplated by the present invention that major surface 120 at strap body end 116a may provide a ramp 121 extending from a transverse edge 152 positioned within, and falling away from, passageway 122 in the insertion direction shown by arrow A in FIG. 7. Transverse edge 152 thereby defines the lower limit of strap egress end 126 of passageway 122. An upper brace 146 spans between side walls 140 and 142 in flush edge relationship with upper surfaces 140d and 142d and adjacent proximal ends 140b and 142b. Upper brace 146 includes flared surface 148 which terminates in edge 150. Edge 150 defines the upper limit of strap egress end 126 of passageway 122.

It is contemplated by the present invention that in cable tie 110 either one or both of flared surface 148 and ramp 121 extend slightly into passageway 122 so as to engage one or both of major surfaces 118 and 120 of strap body 116 during strap insertion. After tail 114 is inserted through passageway 122 and pulling forces in the direction of arrow A are applied to that portion of the strap body that protrudes from passageway 122, either one or both of edges 150 and 152 may frictionally grip a major surface of strap body 116 and thereby minimize the stretching of strap body 116 within head 112. As a result, the longitudinal deflection of locking teeth 136 on major surface 120 of strap body 116 is also minimized so as to better maintain the pitch alignment between locking teeth 136 and pawl locking teeth 134.

Detents 129a and 129b each include a lower surface 138a and 138b, respectively, which define the upper limit of strap ingress end 124 of passageway 122. Portions 141a and 141b of lower surfaces 138a and 138b taper towards passageway 122 in the direction of arrow A for assisting in directing tail 114 into passageway 122. Detents 129a and 129b are desirably centrally located lengthwise within head 112. The central locations of detents 129a and 129b in conjunction with tapered portions 141a and 141b provide a generally wider insertion entry angle α, shown in FIG. 9, for guiding tail 114 into passageway 122 when compared to other known parallel-entry cable ties.

Figure 9:
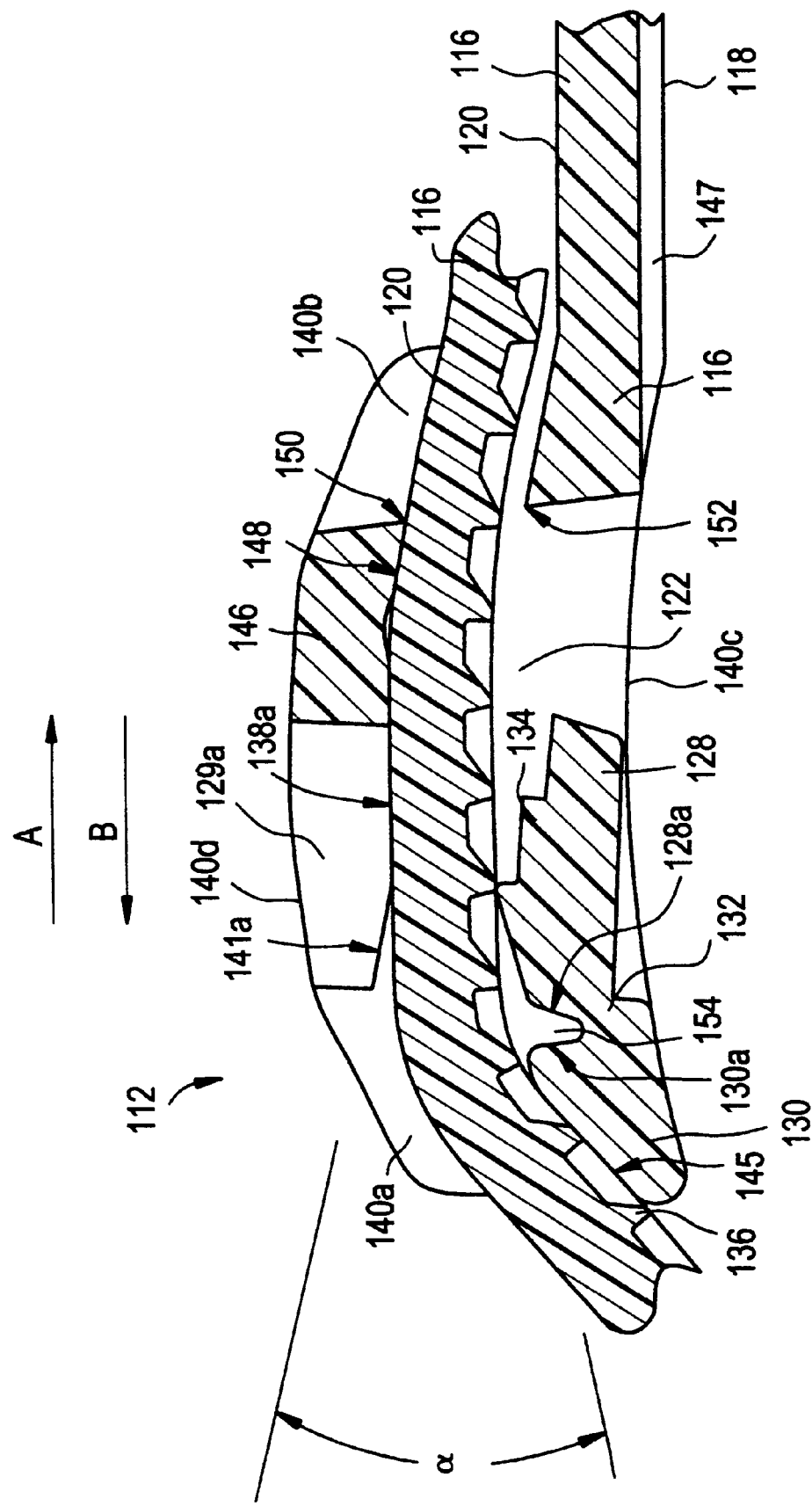
FIG. 9 is a side sectional view of the cable tie of FIG. 6 as the strap body is being inserted through the head.
Figure 10:
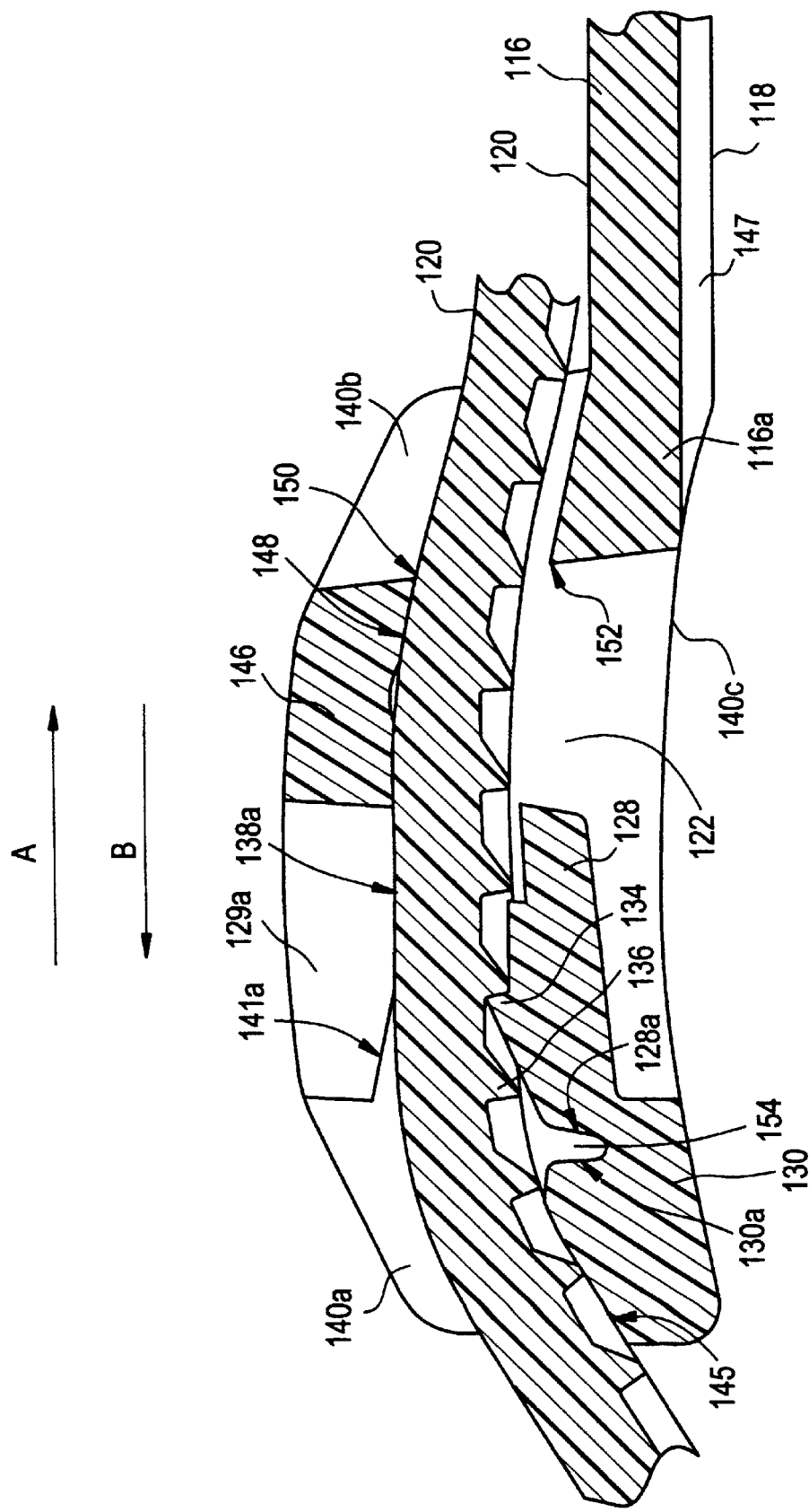
FIG. 10 is a sectional view of the cable tie of FIG. 6 as the insertion force is relaxed.
Figure 11:
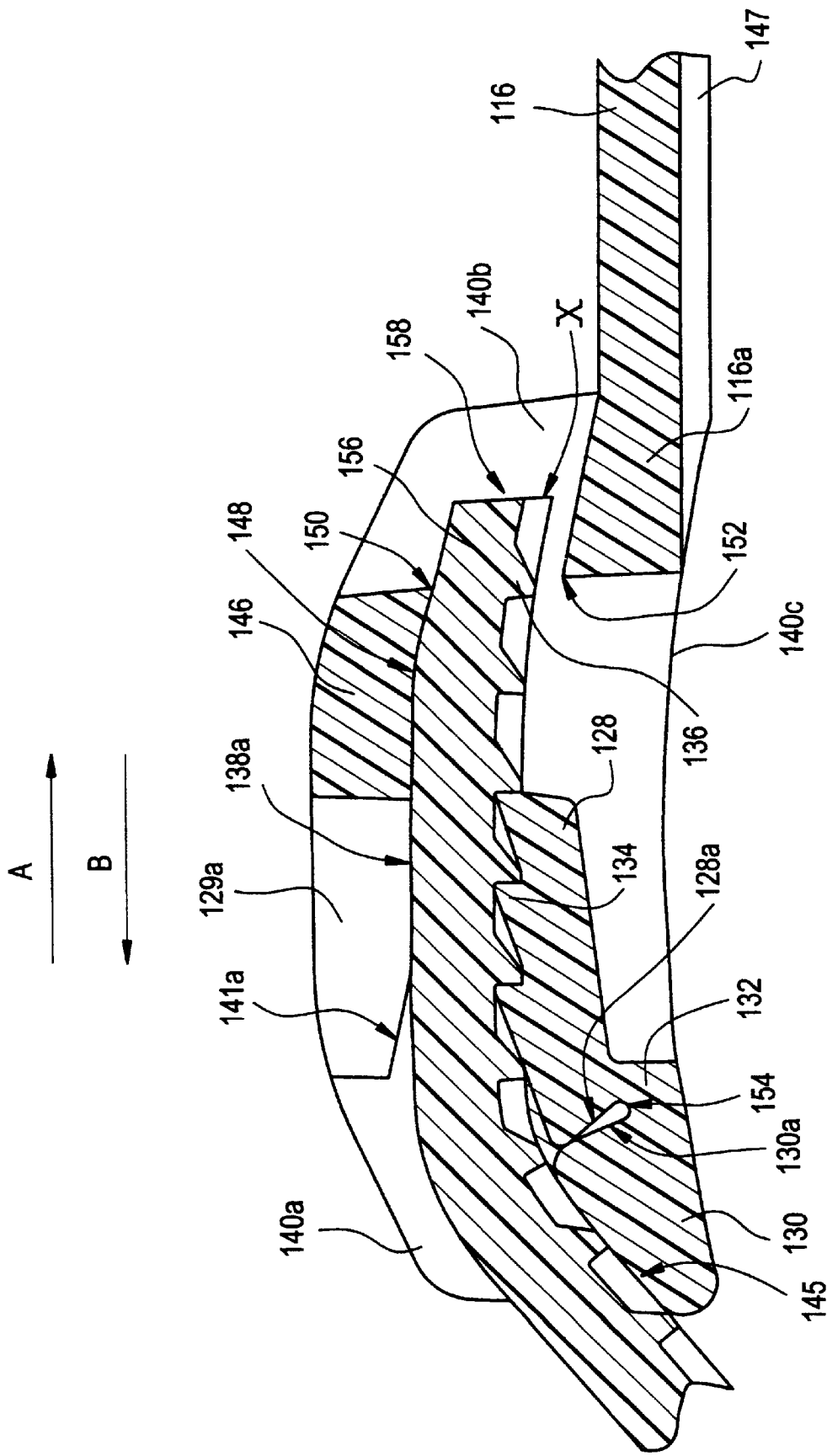
FIG. 11 is a sectional view of the cable tie of FIG. 6 after the excess strap has been severed.
Figure 12:
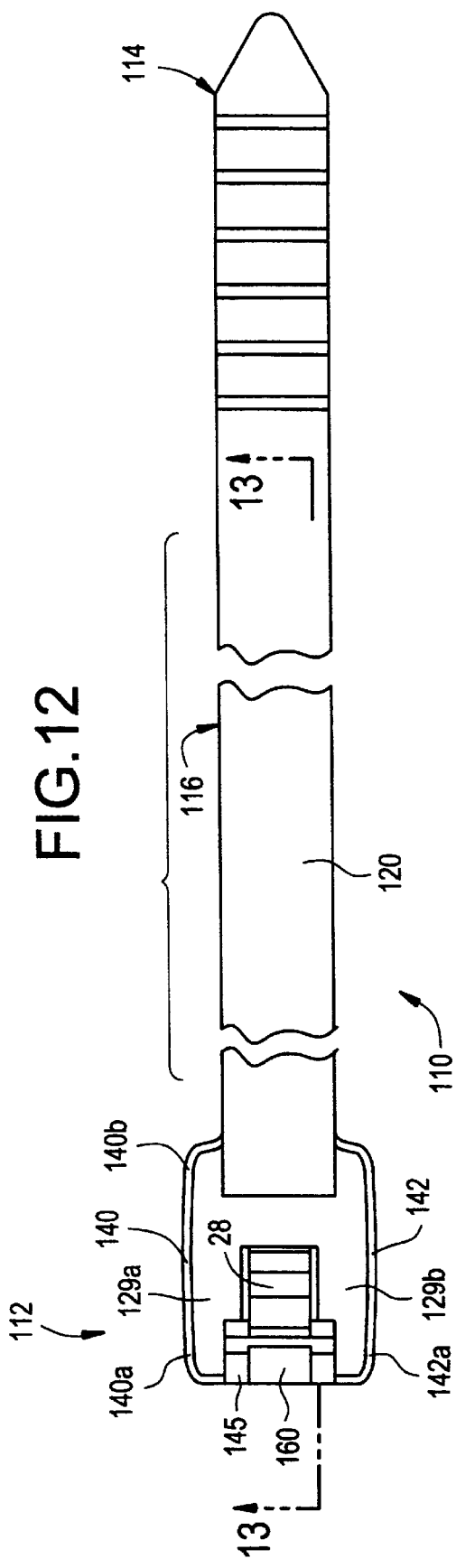
FIG. 12 shows a top plan view of a first alternative embodiment of a cable tie having a fixed tooth of the present invention.
Figure 13:
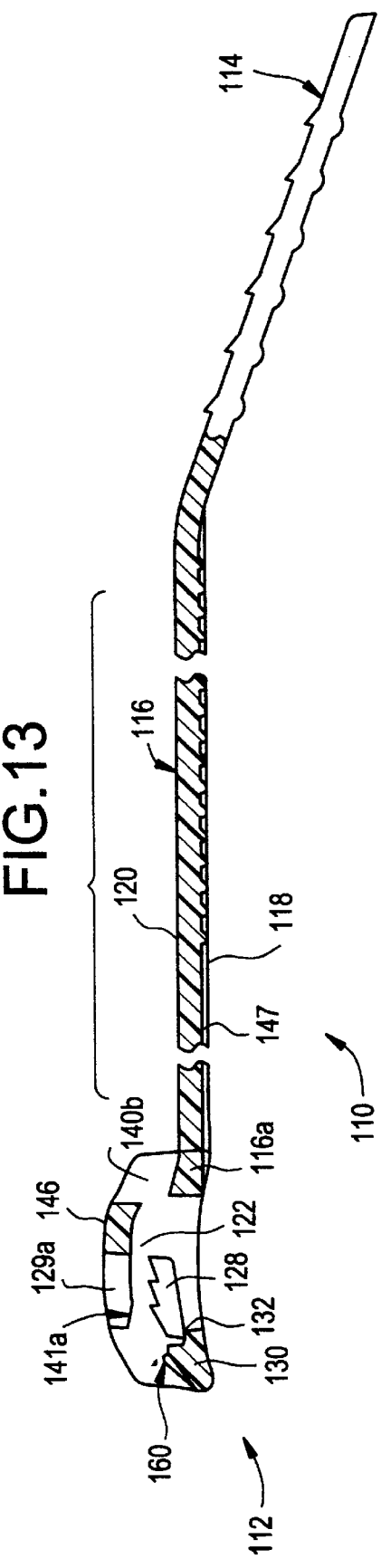
FIG. 13 is a side sectional view of the cable tie of FIG. 12.
Figure 14:
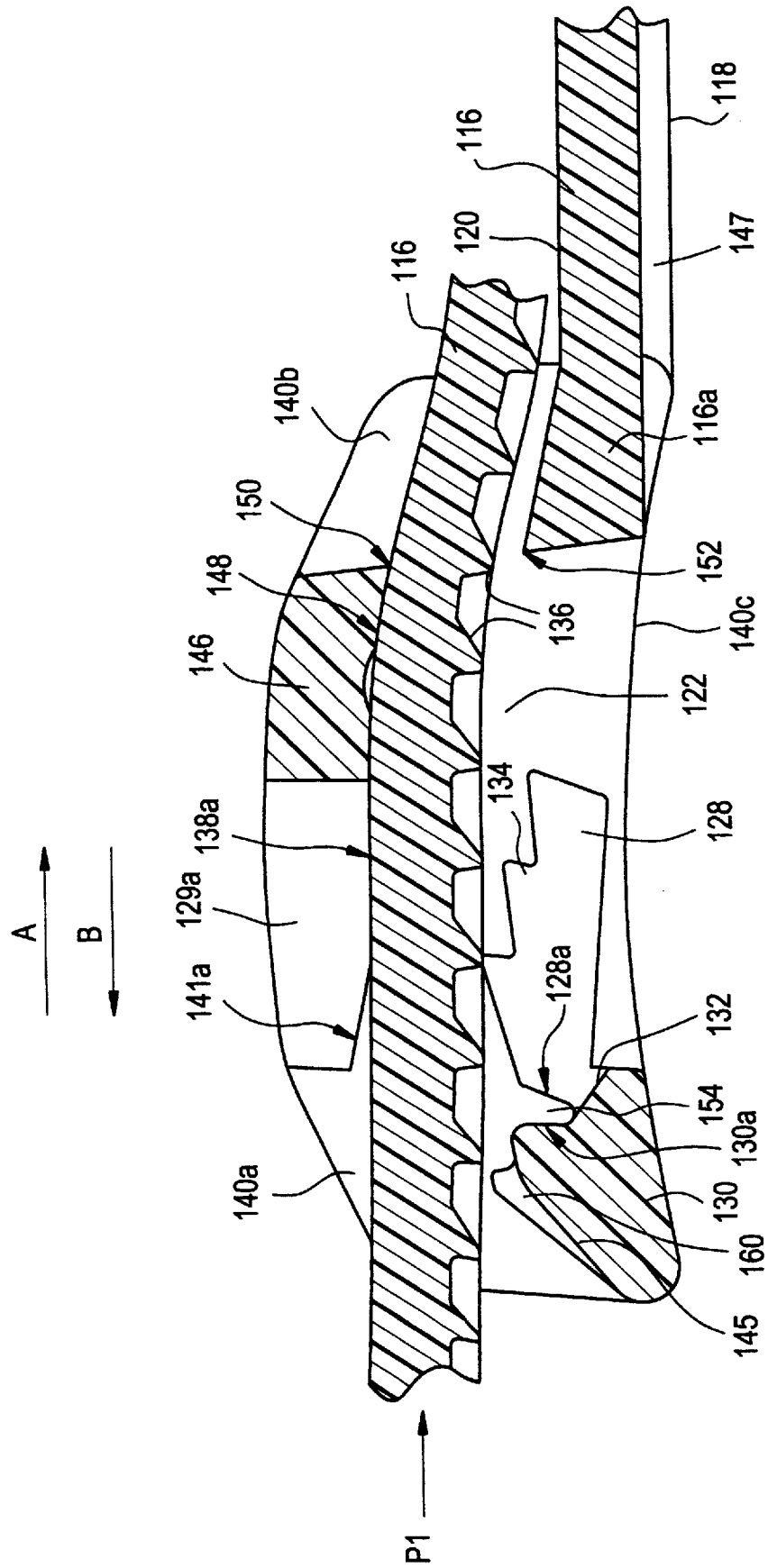
FIG. 14 is a side sectional view of the cable tie of FIG. 12 as the strap body is initially being inserted through head.

Support shoulder 130 spans between side walls 140 and 142, preferably between distal ends 140a and 142a, and defines the lower extent of ingress end 124 of passageway 122. In a preferred embodiment, as best illustrated in FIGS. 7 and 9–11, support shoulder 130 includes an upper surface 145 which tapers towards passageway 122 to further assist in guiding tail 114 into passageway 122 and to allow strap body 116 to better conform to the circumferential or peripheral shape of the article or articles being bundled. Locking pawl 128 is flexibly connected to shoulder 130 by flexible hinge 132. As best seen in FIGS. 9–11, hinge 132 defines the closed end of a transverse notch 154 between locking pawl 128 and support shoulder 130 and opening towards passageway 122. In an undeflected position, locking pawl 128 protrudes into passageway 122, as best shown in FIG. 7.

With reference to FIG. 9, the insertion of tail 114 and strap body 116 through passageway 122 in the direction of arrow A causes locking pawl 128 to pivot away from passageway 122 so that tail 114 and strap body 116 may pass through head 112. As is known in the art, the pivoting of locking pawl 128 actually includes a combination of rotation and deflection about hinge 132. With additional reference to FIG. 10, when recoil, or withdrawal, forces acting in the direction of arrow B are applied to strap body 116, pawl locking teeth 134 engage locking teeth 136 on strap body 116. Locking pawl 128 will pivot in a direction opposite to the insertion pivot direction until pawl surface 128a abuts against shoulder surface 130a as shown in FIG. 11. In a preferred embodiment, locking pawl 128 forces strap body 116 against detents 129a and 129b throughout insertion of, relaxation of the insertion force upon, and locking of strap body 116.

As with any conventional operation known for cable ties, tail 114 is wrapped around a bundle of articles and inserted in the direction of arrow A through head 112. Tapered surface 145 of shoulder 130 and portions 141a and 141b of detents 129a and 129b may guide tail 114 into strap ingress end 124 and therethrough passageway 122, exiting head 112 through strap egress end 126. As strap 116 is similarly pulled through passageway 122, locking pawl 128 is rotated and deflected about flexible hinge 132 in a direction away from the inserted strap body, as shown in FIG. 8. Tail 114 is pulled through head 112 until the cable tie tightly encircles the bundle of articles. As the encirclement of the bundle of articles grows tighter, continued pulling of tail 114 in the direction of arrow A causes tail 114 and strap body 116 to longitudinally expand in the direction of arrow A. The engagement by flared surface 148 of major surface 118 of strap body 116 provides resistance to the continued pulling of tail 114 and thereby limits the longitudinal expansion of strap body 116 within head 112. While the portion of strap body 116 protruding from head 112 remains subject to the full tensile load of the continued pulling of tail 114, the portion of strap body 116 within head 112 will be subject to a lesser tensile load so that the longitudinal expansion of locking teeth 136 about pawl locking teeth 134 will be minimized. As cable tie 110 is secured about the bundle, the arcuate tapered sidewalls of head 112 provide a low profile and render the bundle relatively easier to pull across an obstruction without the cable tie catching thereon.

It is contemplated that the portion of tail 114 and strap body 116 protruding from head 112 may be engaged and pulled by a tool (not shown) used for tightening cable ties as is known in the prior art. The tool, once cable tie 110 is secured about the bundle of articles, can also sever the portion of strap body 116 protruding from head 112 at location X between proximal ends 140b and 142b of side walls 140 and 142 respectively. As shown in FIG. 11, severing of strap body 116 results in severed end 156 having severed perimetrical edge 158. Proximal ends 140b and 142b serve as a pair of strap edge-barriers by extending beyond location X sufficiently to maintain severed perimetrical edge 158 therebetween and to obviate hazards posed by the severed perimetrical edge 158.

The release or severing of strap body 116 results in recoil forces acting in the direction of arrow B to recoil strap body 116 across locking pawl 128 and around the bundle of articles. Such a recoiling force causes pawl locking teeth 134 to engage locking teeth 136 on strap body 116 so that locking pawl 128 is caused to counter-rotate and deflect back towards strap body 116. Locking pawl 128 will desirably continue to counter-rotate until pawl surface 128 abuts against shoulder surface 130a. The positioning of locking pawl 128 between the bundle of articles and strap body 116 and side walls 140 and 142 provides a tamper-resistant locking engagement between locking pawl 128 and strap body 116 so that the bundle of articles remains bound by cable tie 110.

Figure 15:
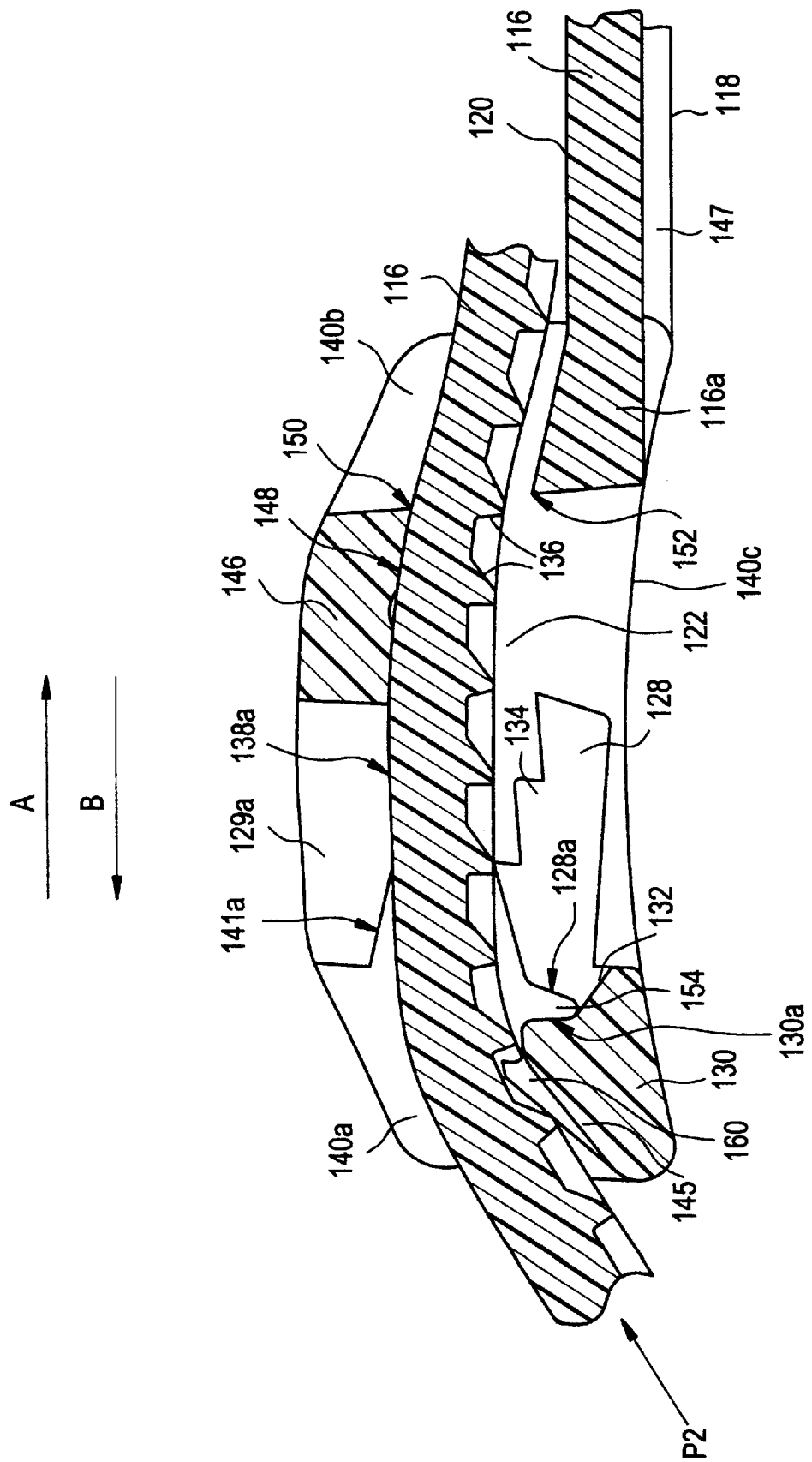
FIG. 15 is a side sectional view of the cable tie of FIG. 12 as the strap body is being inserted through head prior to fully securing an article to be bundled.
Figure 16:
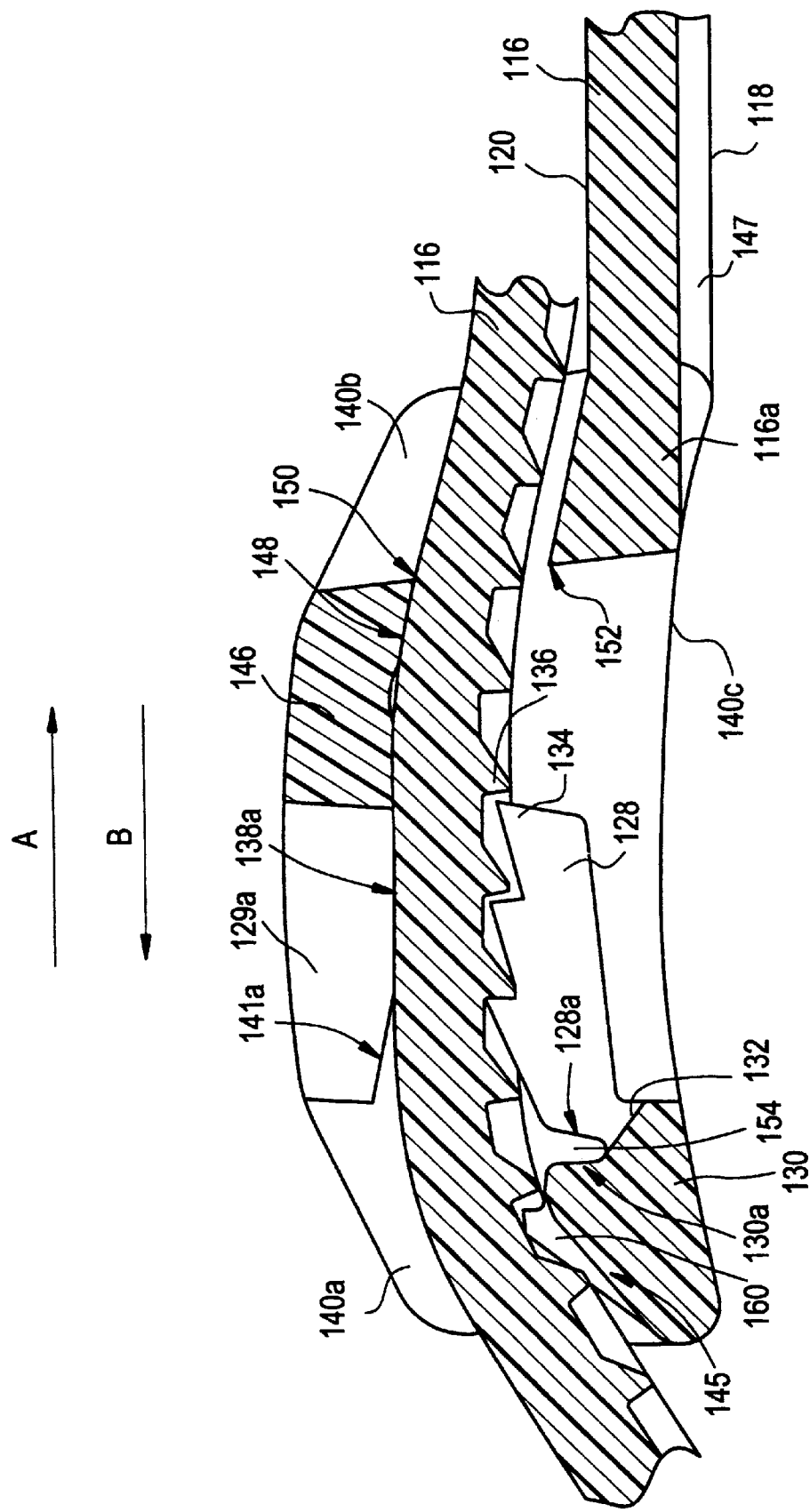
FIG. 16 is a sectional view of the cable tie of FIG. 12 as the insertion force is relaxed.
Figure 17:
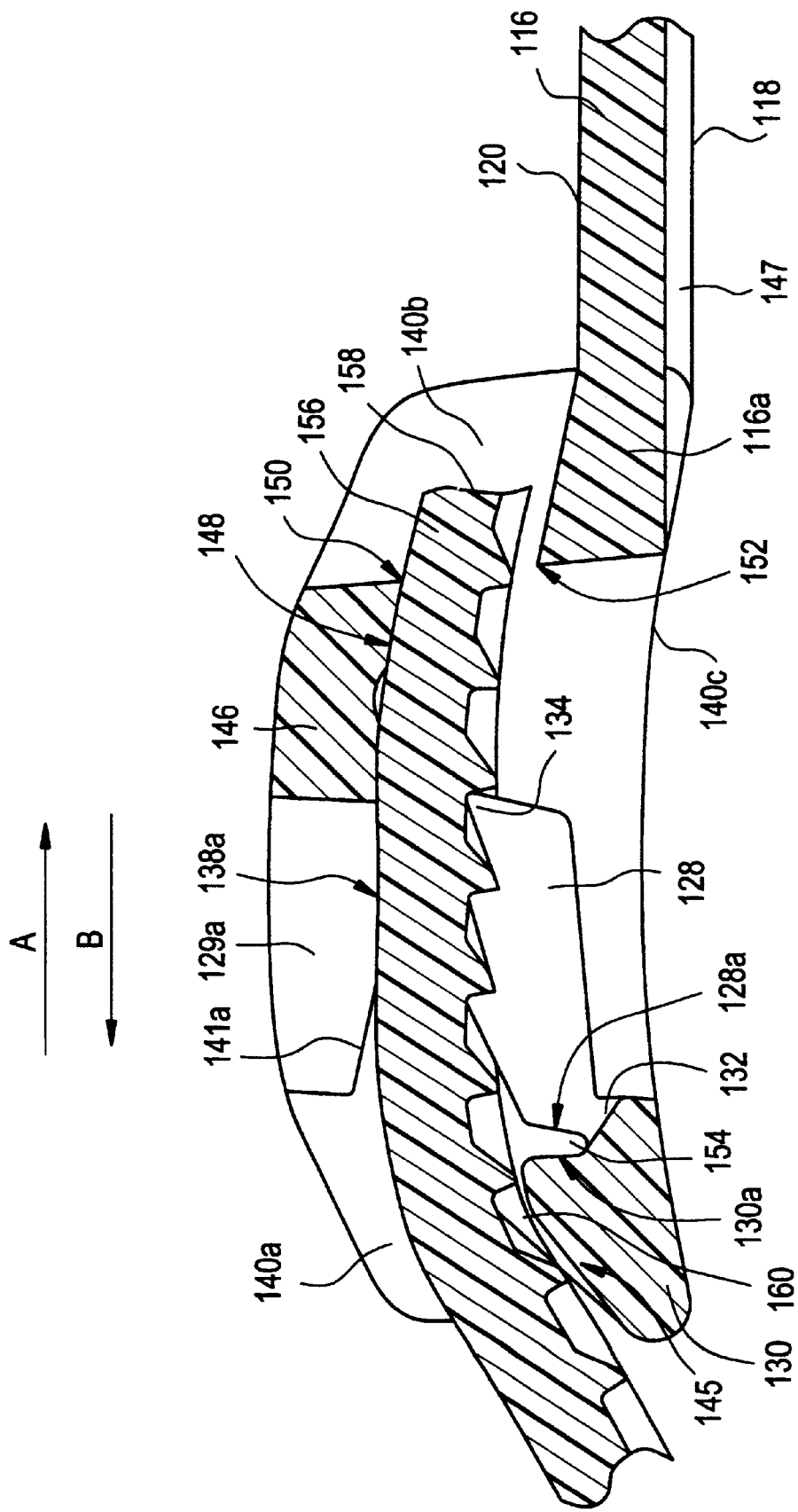
FIG. 17 is a sectional view of the cable tie of FIG. 12 after the excess strap has been severed.

Referring now to FIGS. 12–17, head 112 may further include a fixed tooth 160 rigidly or integrally mounted on tapered upper surface 145 of support shoulder 130. Fixed tooth 160 may be formed by conventional molding practices. Fixed tooth 160 is desirably positioned to be offset from passageway 122 so as to allow tail 114 and a significant portion of excess length of strap body 116 to be inserted through head 112 without requiring either of fixed tooth 160 or strap teeth 136 to deflect. That is, with reference to FIGS. 14 and 15, fixed tooth 160 is desirably positioned so that tail 114 and a length of strap 116 may be inserted through passageway 122 along a first insertion path P1 without strap 116 engaging fixed tooth 160 until a bundle is nearly secured thereby; at which time strap 116 is entering passageway 122 along a second insertion path P2 and overriding fixed tooth 160 until full bundle securement. As seen in FIGS. 15–17, the recoil forces acting in the direction of arrow B pull pawl 128 into passageway 122 and increase the effectiveness of locking tooth 160 by drawing strap 116 closer to hinge 132.

Flexible pawl 128 may therefore initiate the locking action of cable tie 110 while fixed tooth 160 only later engages strap 116 as strap 116 is tightened about a bundle. The tapering shoulder surface 145 ensures that recoil loads pull strap 116 toward pawl hinge 132 during the tightening process ensuring reliable engagement with fixed tooth 160. Cable tie 110 therefore provides a low strap insertion force common to one-piece cable ties, until strap body 116 comes down upon fixed tooth 160 during the final stages of cable tie securement, while providing a comparatively higher loop tensile strength due to fixed tooth 160 engaging a strap locking tooth 134 and relieving a portion of the load acting on pawl 128. Fixed locking tooth 160 is expected to increase the locking tensile strength of cable tie 110 by up to 25% or more. For example, if the locking strength of the flexible pawl is 60 pounds, the addition of a fixed tooth will increase the split mandrel tensile strength to a minimum of 75 pounds.

FIGS. 18–24 show a cable tie 210 presenting further features of the present invention. To the extent possible, the numbering scheme for cable tie 210 is consistent with the previously described embodiments of the present invention. Cable tie 210 includes a head 212, a tail 214 and an elongate strap body 216 therebetween. Strap body 216 includes opposed major surface 218 and 220. Major surface 218 includes a plurality of transverse locking teeth 236 formed thereon and an elongate channel 247 from about head 212. Head 212 includes an elongate passageway 222 therethrough in a direction substantially parallel to the plane of strap body 216. Passageway 222 includes a strap ingress end 224 and a strap egress end 224. Head 212 includes a transverse member 246 and detents 229a and 229b to one side of passageway 222. Detents 229a and 229b include surfaces 241a and 241b, respectively, which provide a tapering entrance to passageway 222.

Head 212 further includes a fixedly supported shoulder 230 from which a deflectable locking pawl 228 and a deflectable chin 270 extend opposite passageway 222 from transverse member 246 and detents 229a and 229b. Pawl 228 connects to shoulder 230 at flexible hinge 232 and includes transverse locking teeth 234 for providing locking engagement with teeth 236 of strap body 216. Hinge 232 defines the closed end of an elongate notch 254 opening towards passageway 222 and bounded by pawl surface 228a and shoulder surface 230a. Hinge 232 desirably includes a transverse bead 233 projecting between pawl 228 and shoulder 230 on the side of hinge 232 opposite notch 254. As is known in the art, the pivoting of locking pawl 228 actually includes a combination of rotation and deflection about hinge 232.

Deflectable chin 270 connects to, and cantileverally deflects about, shoulder 230 at flexible hinge 275. Hinge 275 defines the closed end of an elongate notch 272 opening towards the bundle and bounded by pawl surface 230b and chin surface 274. Deflection of chin 270 about hinge 275 causes relative movement of chin surface 274 towards or away from pawl surface 230b. The underside of chin 270 preferably includes a number of elongate slip prevention ribs 276 for providing slip resistant engagement between cable tie 210 and a bundle (not shown) secured thereby.

Upper pawl surface 245 supports at least one transverse cantilever locking tooth 260 which forms one end extant of deflectable chin 270. The top of tooth 260 is defined by an elongate strap-engaging surface 271 extending to the free end 270a of chin 270. An engaging face 260a of tooth 260 is desirably centrally located across shoulder 230 with respect to notch 272 and beyond hinge 275 in the insertion direction for strap 216 as shown by arrow A. Tooth 260 is thereby caused to pivot about shoulder 230 as chin 270 deflects about hinge 275, as will be described hereinbelow.

Figure 23:
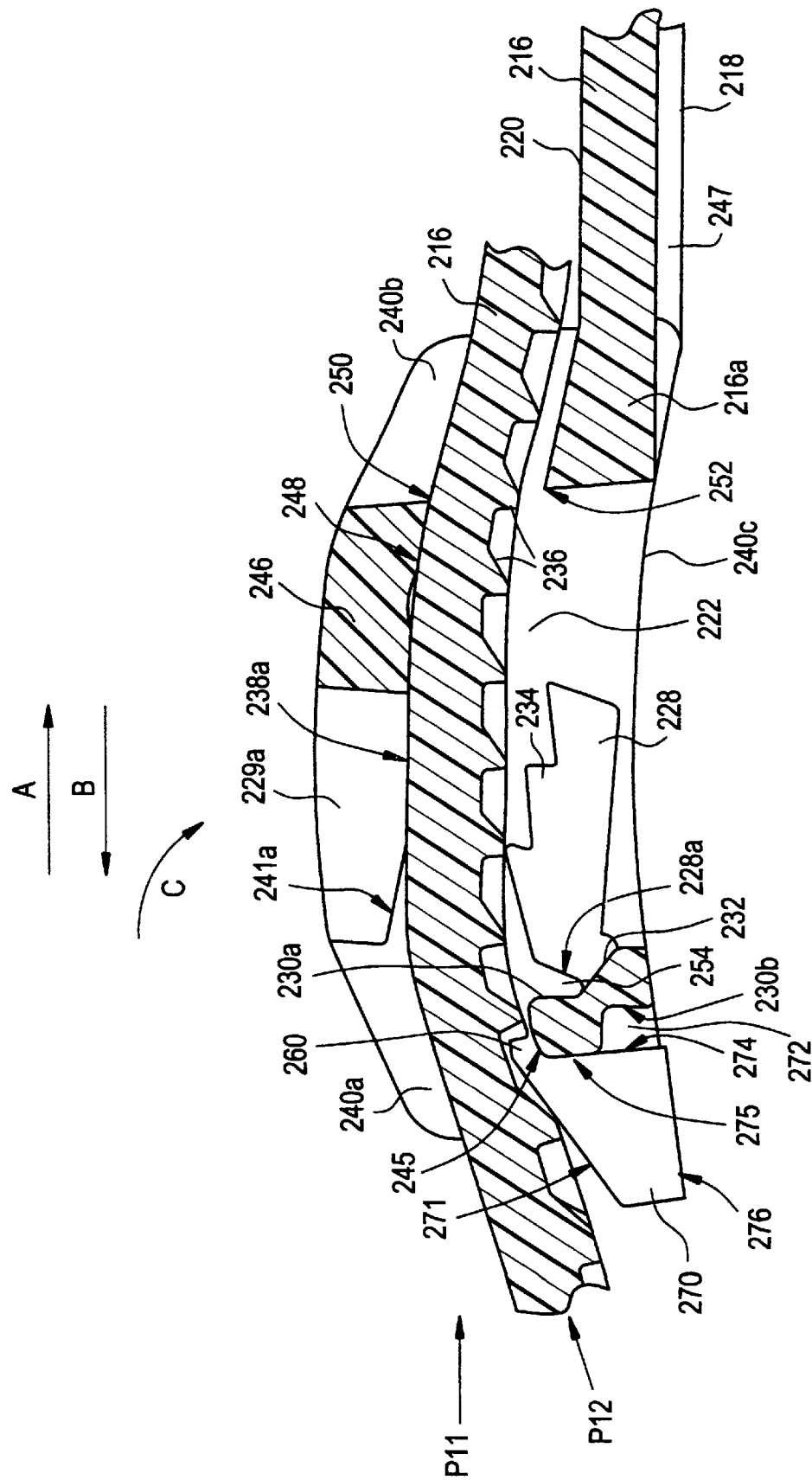
FIG. 23 is a side sectional view of the head of the cable tie of FIG. 18 as a strap begins to tightly encircle a bundle of articles.
Figure 24:
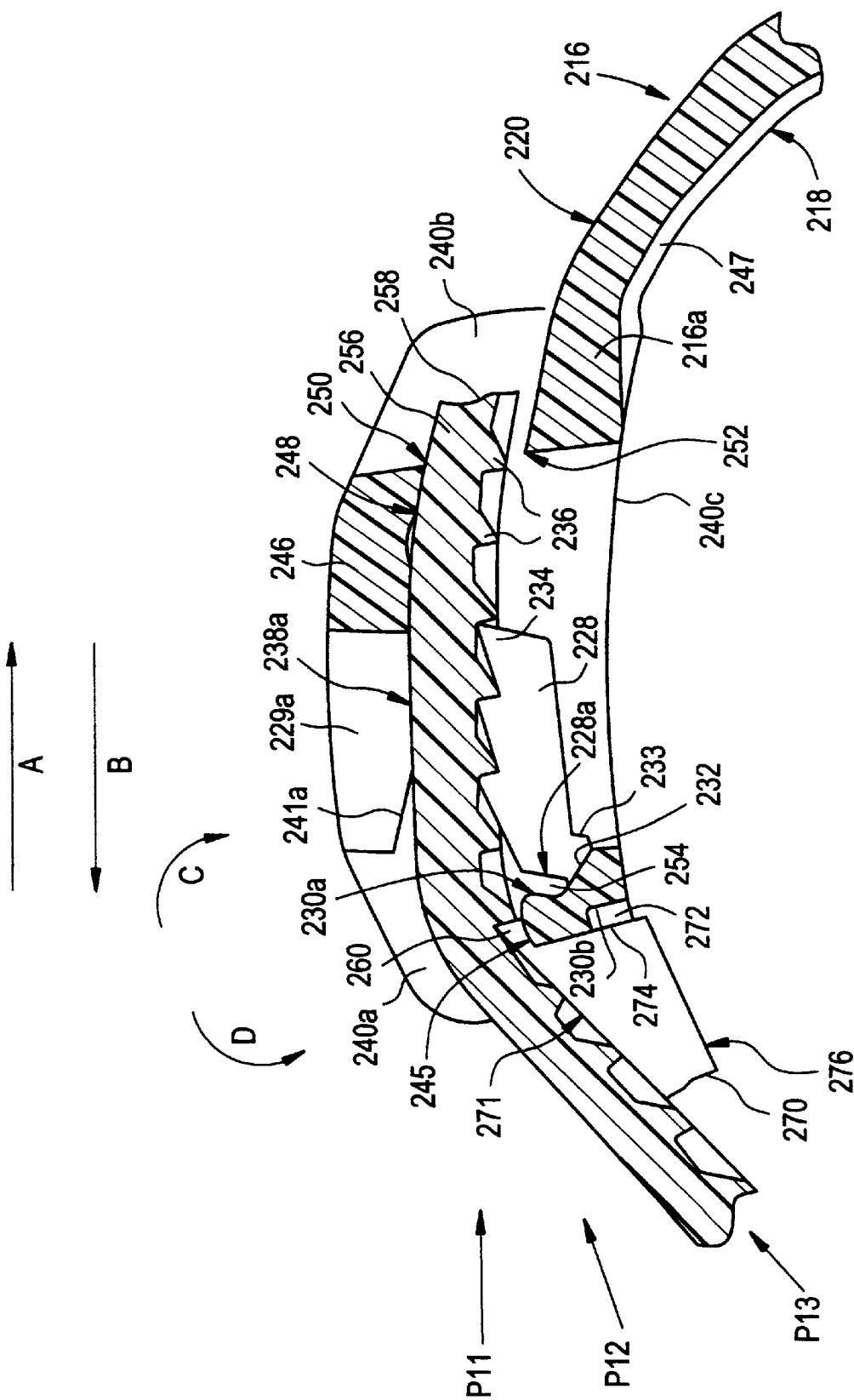
FIG. 24 is a side sectional view of the assembly of FIG. 21 as the strap is tightly secured about a bundle of articles.

With particular reference to FIGS. 22–24, the operation of cable tie 210 is similar to that previously described for the present invention. Tail 214 and strap 216 are wrapped around a bundle including an article or articles and tail 214 is inserted into strap ingress end 224 of passageway 222 in the direction of arrow A. Tail 214 is guided into passageway 222 by surface 271 and the oppositely tapering surfaces 241a and 241b. Tail 214 and strap 216 may initially enter passageway 222 along a path P11 whereby the locking teeth 236 of strap 216 pass clear over tooth 260 on shoulder 230. Pawl 228 pivots about hinge 232 in the direction of arrow C so as to be clear of passageway 222 as strap 216 is inserted therepast through passageway 222. As strap 216 is forced into tighter engagement with the bundle, strap 216 will begin to enter passageway 222 from the direction of a path P12 more orthogonally oriented to passageway 222 than path P11 and resulting in interference between locking teeth 236 on strap 216 and locking teeth 234 on pawl 228. Still further tightening of strap 216 about the bundle will cause strap 216 to radially compress about the bundle and to push against surface 271 of chin 270, forcing chin 270 to deflect about hinge 275 in the direction of arrow D. Strap 216 will now be entering passageway 222 along a third path P13 that is even more orthogonally aligned therewith than paths P11 and P12. As shown in FIG. 24, deflection of chin 270 causes locking tooth 260 to deflect therewith and maintain a reliable locking alignment with a locking tooth 236 of strap 216. Recoil forces acting on strap 216 in the direction of arrow B cause pawl 228 to deflect into passageway 222 so that the locking teeth 236 of strap 216 will be engaging both the locking tooth 260 of chin 270 and the locking teeth 234 of pawl 228. Recoil forces also result in both pawl 228 and chin 270 rotating in a like directio shown by arrow D.

It may be appreciated that paths P11, P12, and P13 may respectively require greater insertion forces for advancing strap body 216 through passageway 222. For example, as long as strap 216 enters passageway along a path, such as P11, that provides clearance between locking teeth 236 on strap 216 and locking tooth 260 the required insertion force will approximate that which is known for one-piece cable ties having a deflectable locking element. It is contemplated that path P12 will require a higher insertion force than path P11 as the locking teeth 236 and 260 will interfere with strap insertion. Similarly, path P13 would require a still higher insertion force as such an entry path will further require deflection of chin 270 about hinge 275. However, it may be further appreciated that when strap body 216 is inserted along paths P12 and P13, the loop tensile strength of cable tie 210 will also be appreciably higher.

As above described and as shown in FIGS. 18–24, head 212 supports two counter-rotatable deflectable locking members, 228 and 270, to one side of passageway 222. Both pawl 228 and chin 270 provide at least one locking tooth for locking engagement of strap body 216 when inserted through passageway 222 and when tightly encircling a bundle. Deflection of chin 270 also results in ribs 276 deflecting towards engagement with the bundle so as to provide an even greater hold on the bundle and thereby further resist slippage or movement along the length of the bundle when transverse forces (not represented) are applied to the assembled cable tie. Chin 270 therefore augments the low profile provided by a cable tie of the present invention while also allowing for increasingly smaller bundling radius of the cable tie so that smaller diameter bundles may be reliably secured thereby.

It is also contemplated that features of the present invention may be employed with a two-piece parallel-entry cable tie employing a deflectable metallic barb in place of a flexible integral pawl. Referring now to FIG. 25, a cable tie 310 having a head 312, a tail 314, and an elongate strap body 316 therebetween may be provided including an elongate passageway through head 312 in a direction substantially parallel to the plane defined by strap body 316. While the head 312 shown in FIG. 25 is formed to be similar to the head 12 shown in FIGS. 1–5, head 312 may also be formed to be similar to head 112 of FIGS. 6–17. The deflectable locking element of cable tie 310, however, desirably takes the form of a stainless steel locking barb 332 embedded into shoulder 330 at an acute angle rather than an integrally formed pawl connected to the shoulder by a hinge.

Shoulder 330 may be formed having an upper surface 330a which tapers towards passageway 322 so as to assist the guidance of tail 314 thereinto. Similarly, cross member 344 may be formed having a lower surface 344a which also tapers towards passageway 322 to further assist the guidance of tail 314 thereinto. Head 310 may further include a transverse member 346 having a surface 348 which flares into passageway 322 and terminates at transverse edge 350. Edge 350 frictionally engages strap body 316 during strap insertion and tightening to minimize stretching of strap body 316 at barb 332. While not shown, it is further contemplated by the present invention that head 312 may be formed having an arcuately bowing sidewalls so as to conform to the article or articles being bundled.

The present invention therefore contemplates a low profile cable tie that provides tapering surfaces to guide the tail of the cable tie into the passageway through the head. The present invention is able to minimize the stretching of the strap body when adjacent to the locking pawl by providing an edge which frictionally engages the strap body as the strap body egresses from the passageway of the head. The present invention further provides a one-piece cable tie having a fixed locking tooth in addition to the tooth or teeth of the locking pawl. The fixed locking tooth of the present invention is desirably positioned to allow unobstructed insertion of the tail through the head. It is further contemplated by the present invention to provide a cable tie having a pair of counter-rotatable locking elements positioned to one side of the passageway through the head. One of the counter-rotatable locking elements may deflect into engagement with a surface of an article being bundled so as to provide greater slip resistance of the cable tie with respect to the article and to further allow an even smaller bundling radius for the cable tie. The cable tie of the present invention also conceals the edges formed by cutting the excess length of strap body that protrudes from the head. Additionally, the present invention provides a cable tie having a tamper-resistant locking pawl. Furthermore, the cable tie of the present invention includes a passageway through the head which is substantially parallel to the plane of the strap and a deflectable locking element which may be integrally formed with the head or separately provided within the head.

While the particular preferred embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A low profile bundling tie for bundling a number of articles, comprising:

an elongate strap having a locking head at one end and a tail at the other end, said elongate strap including a first major surface to be disposed away from said number of articles and a second major surface, opposite said first major surface, to be disposed towards said number of articles;

said head providing a strap ingress end and a strap egress end and an internal passageway communicating therebetween, said strap egress end being located proximal to said elongate strap, said passageway defining a strap insertion direction from said strap ingress end to said strap egress end and a strap withdrawal direction opposite said strap insertion direction; and said head further including a fixed locking member adjacent said strap ingress end, and extending away from said bundle of articles, for engaging said second major surface of said strap.

2. The bundling tie of claim 1, wherein said second major surface includes transverse locking teeth disposed thereon; and wherein said locking head further includes:

a first transverse member adjacent said ingress end for engaging said second major surface of said strap when inserted through said passageway, said first transverse member further supporting a flexible locking pawl within said passageway, said locking pawl including transverse locking teeth formed to engage the locking teeth disposed on said second major surface of said strap; and a second transverse member adjacent said passageway opposite said pawl so as to engage said first major surface of said strap when inserted through said passageway.

3. The bundling tie of claim 2, wherein said first and second transverse members include opposed tapering surfaces defining said strap ingress end.

4. The bundling tie of claim 2, wherein said second transverse member further includes a strap engaging surface tapering towards said passageway and which frictionally grips a section of the strap that has been inserted past the locking pawl and thereby minimizes stretching of the strap about the pawl by forces pulling, in an insertion direction, on that portion of the strap exiting said head through said egress end.

5. A bundling tie of claim 1, wherein said fixed locking tooth is offset from said strap ingress end so as to allow a portion of strap to be inserted into said passageway clear of said fixed locking tooth.

6. A low profile bundling tie for bundling a number of articles including:

a locking head;

a tail; and an elongate strap therebetween having a first major surface and an opposed second major surface having and a number of transverse locking teeth thereon;

wherein said locking head includes an elongate passageway therethrough having a strap ingress end and an opposed strap egress end and a deflectable locking member extending into said passageway and being deflectable from said passageway upon said strap being inserted therepast in an insertion direction and providing locking engagement with said locking teeth of said strap upon movement of said strap in a withdrawal direction opposite to said insertion direction;

said locking head further including a fixed locking member adjacent said strap ingress end so as to allow said tail and a portion of said strap to be inserted into said passageway clear of said fixed locking member and to provide locking engagement with said locking teeth of said strap in said withdrawal direction.

7. A bundling tie according to claim 6, wherein said head includes an arcuately bowing surface facind said number of articles to be bundled; and wherein said deflectable locking member includes a number of locking teeth formed thereon for engaging said transverse locking teeth of said strap.

8. A bundling tie according to claim 6, wherein said head provides a pair of oppositely tapering surfaces defining said strap ingress end of said passageway.

9. A bundling tie according to claim 6, wherein said head provides a transverse edge at said strap egress end of said passageway, said transverse edge frictionally engaging said strap past said locking member in said insertion direction so as to minimize stretching of said strap at said locking member.

10. A bundling tie according to claim 6, wherein said locking head is further defined by a pair of opposed elongate sidewalls, a first transverse member, and a second transverse member, wherein said first transverse member supports said deflectable locking member and said fixed locking member.

11. A bundling tie according to claim 10, wherein said sidewalls each include opposed longitudinal ends defined by surfaces tapering from a first edge adjacent said number of articles to be bundled to a second edge opposite said number of articles to be bundled.

12. A bundling tie according to claim 10, wherein said second transverse member includes a transverse edge at said strap egress end of said passageway, said transverse edge frictionally engaging said strap past said locking member in said insertion direction so as to minimize stretching of said strap at said deflectable locking member.

13. A bundling tie according to claim 10, wherein said first transverse member and said second transverse member include oppositely tapering surfaces which define said ingress end of said passageway, said oppositely tapering surfaces guiding said tail into said passageway in said insertion direction.

14. A bundling tie according to claim 10, wherein said deflectable locking member is further defined by an integral locking pawl connected to said first transverse member by a flexible hinge, said locking pawl including a number of transverse locking teeth for engaging said transverse locking teeth of said strap.

15. The bundling tie of claim 14 wherein said hinge defines the closed end of a notch formed between said pawl and said first transverse member, said notch opening in a direction facing said passageway.

16. A low profile bundling tie for bundling a number of articles including:

a locking head;

a tail; and an elongate strap therebetween having a first major surface and an opposed second major surface having and a number of transverse locking teeth thereon;

wherein said locking head includes an elongate passageway therethrough having a strap ingress end and an opposed strap egress end, and a transverse shoulder element supporting a pair of counter-rotatable deflectable locking members including a locking pawl supporting a first deflectable locking member extending into said passageway and being deflectable from said passageway upon said strap being inserted therepast in an insertion direction and providing locking engagement with said locking teeth of said strap upon movement of said strap in a withdrawal direction opposite to said insertion direction, and a second deflectable locking member hingedly supported by said transverse shoulder element so as to be counter rotatable to said first deflectable locking member, said second deflectable locking member positioned adjacent said strap ingress end so as to allow said tail and a portion of said strap to be inserted into said passageway clear of said second deflectable locking member and to provide locking engagement with said strap in said withdrawal direction.

17. A bundling tie of claim 16, wherein said locking pawl includes a number of transversely-oriented pawl locking teeth for engaging said locking teeth on said strap and wherein said second deflectable locking member includes a bundle engaging rib, whereby deflection of said second deflectable locking member drives said rib towards a surface of one of said number of articles to be bundled.

18. A bundling tie of claim 16, wherein said second deflectable locking member further comprises a deflectable chin element supporting a fixed locking tooth, said chin element being hingedly supported by said transverse member.

19. A bundling tie of claim 18, wherein said chin and said transverse member define an elongate notch opening away from said passageway, and wherein said fixed locking tooth is supported opposite a closed end of said notch.

* * * * *